US012778118B2

(12) United States Patent
Falk et al.

(10) Patent No.: US 12,778,118 B2
(45) Date of Patent: Nov. 3, 2026

(54) DISINFECTING FORMULATIONS WITH CARVACROL

(71) Applicant: THE CLOROX COMPANY, Oakland, CA (US)

(72) Inventors: Nancy A. Falk, Bath, ME (US); Crystal Bell, Pleasanton, CA (US); William King, Pleasanton, CA (US); Marjan Hashemi, Pleasanton, CA (US); Nipa Modi, Pleasanton, CA (US); Keith Mainquist, Pleasanton, CA (US); Xuanrong Guo, Pleasonton, CA (US); Walter Schenck, Pleasanton, CA (US); Ronald Thomas Anderson, Pleasanton, CA (US); Kelly Dickson, Pleasanton, CA (US); Miguel Lopez, Pleasanton, CA (US); Giselle Janssen, Pleasanton, CA (US); Bryan K. Parrish, Pleasanton, CA (US); Claire Dentinger, Pleasanton, CA (US); Thomas Fahlen, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 912 days.

(21) Appl. No.: 18/179,191

(22) Filed: Mar. 6, 2023

(65) Prior Publication Data

US 2023/0301299 A1 Sep. 28, 2023

Related U.S. Application Data

(60) Provisional application No. 63/323,379, filed on Mar. 24, 2022.

(51) Int. Cl.
*A01N 31/08* (2006.01)
*A01N 25/02* (2006.01)
(Continued)

(52) U.S. Cl.
CPC ............ *A01N 31/08* (2013.01); *A01N 25/02* (2013.01); *A01N 25/30* (2013.01); *A01P 1/00* (2021.08)

(58) Field of Classification Search
None
See application file for complete search history.

(56) References Cited

U.S. PATENT DOCUMENTS 3,929,678 A 12/1975 Laughlin et al.
4,171,047 A 10/1979 Doyle et al.
(Continued)

FOREIGN PATENT DOCUMENTS

EP 0791362 A2 * 8/1997 ............... C11D 3/48
EP 0992338 A2 4/2000
(Continued)

OTHER PUBLICATIONS

SLS alkyl chain (Year: 2026).*
(Continued)

*Primary Examiner* — Robert A Wax
*Assistant Examiner* — John W Lippert, III
(74) *Attorney, Agent, or Firm* — Workman Nydegger

(57) ABSTRACT

Cleaning compositions that include carvacrol, in an amount sufficient to provide an antimicrobial effect. For example, the compositions can include 0.1% to 2% by weight of carvacrol. The cleaning compositions advantageously further include a surfactant, particularly an anionic surfactant, which enhances the antimicrobial efficacy characteristics of the carvacrol. For example, the composition can include at least 0.1%, at least 0.3%, or at least 0.5% of one or more anionic surfactants. Alkyl sulfates (e.g., $C_8$ to $C_{12}$ alkyl sulfates) are particularly suitable. A buffer may also be present. The compositions may have a relatively high pH, e.g., 9 to 12. The cleaning composition may exhibit a
(Continued)

significant log reduction against a target microorganism (e.g., *Staphylococcus aureus* and/or others) within a given time period (e.g., 10 minutes, 5 minutes, or the like), when used on a target surface.

20 Claims, 13 Drawing Sheets

(51) Int. Cl.
*A01N 25/30* (2006.01)
*A01P 1/00* (2006.01)

(56) References Cited

U.S. PATENT DOCUMENTS

| | | | | |
|---|---|---|---|---|
| 4,259,217 | A | 3/1981 | Murphy | |
| 4,353,480 | A | 10/1982 | Mcfadyen | |
| 4,565,647 | A | 1/1986 | Llenado | |
| 4,741,944 | A | 5/1988 | Jackson | |
| 4,778,048 | A | 10/1988 | Kaspar et al. | |
| 5,460,833 | A | 10/1995 | Andrews et al. | |
| 5,595,786 | A | 1/1997 | Mcbride et al. | |
| 5,776,872 | A | 7/1998 | Giret et al. | |
| 5,883,059 | A | 3/1999 | Furman et al. | |
| 5,883,062 | A | 3/1999 | Addison et al. | |
| 5,906,973 | A | 5/1999 | Ouzounis et al. | |
| 6,221,823 | B1 | 4/2001 | Crisanti et al. | |
| 6,346,279 | B1 | 2/2002 | Rochon | |
| 6,346,281 | B1 | 2/2002 | Death et al. | |
| 6,551,980 | B1 | 4/2003 | Wisniewski et al. | |
| 6,699,825 | B2 | 3/2004 | Rees et al. | |
| 6,803,057 | B2 | 10/2004 | Ramirez et al. | |
| 6,812,196 | B2 | 11/2004 | Rees et al. | |
| 6,825,158 | B2 | 11/2004 | Mitra et al. | |
| 6,846,498 | B2 | 1/2005 | Death et al. | |
| 6,936,597 | B2 | 8/2005 | Greenwald et al. | |
| 7,008,600 | B2 | 3/2006 | Katsigras et al. | |
| 7,070,737 | B2 | 7/2006 | Bains et al. | |
| 7,354,604 | B2 | 4/2008 | Ramirez et al. | |
| 7,598,214 | B2 | 10/2009 | Cusack et al. | |
| 7,605,096 | B2 | 10/2009 | Tomarchio et al. | |
| 7,658,953 | B2 | 2/2010 | Bobbert | |
| 7,696,109 | B2 | 4/2010 | Ouellette et al. | |
| 7,696,143 | B2 | 4/2010 | Mccue et al. | |
| 7,915,207 | B2 | 3/2011 | Herdt et al. | |
| 8,147,877 | B2 | 4/2012 | Death et al. | |
| 8,569,220 | B2 | 10/2013 | Gaudreault | |
| 8,575,084 | B2 | 11/2013 | Gaudreault | |
| 8,637,088 | B2 * | 1/2014 | Scheuing ................. | C11D 3/33 514/495 |
| 8,648,027 | B2 | 2/2014 | Mitchell et al. | |
| 8,691,292 | B2 | 4/2014 | Daigle et al. | |
| 9,006,165 | B2 | 4/2015 | Mitchell et al. | |
| 9,234,165 | B2 | 1/2016 | Hope et al. | |
| 9,271,492 | B2 | 3/2016 | Cornmell et al. | |
| 9,609,864 | B2 | 4/2017 | Daigle et al. | |
| 9,988,594 | B2 | 6/2018 | Hope et al. | |
| 10,064,409 | B2 | 9/2018 | Hazenkamp et al. | |
| 10,076,115 | B2 | 9/2018 | Salminen et al. | |
| 10,358,624 | B1 | 7/2019 | Mitchell et al. | |
| 10,421,929 | B2 | 9/2019 | Coulter et al. | |
| 2004/0157524 | A1 | 8/2004 | Polat et al. | |
| 2007/0190172 | A1 | 8/2007 | Bobbert | |
| 2008/0003906 | A1 | 1/2008 | Hill et al. | |
| 2013/0028990 | A1 | 1/2013 | Smith et al. | |
| 2014/0350121 | A1 * | 11/2014 | Cornmell ............... | A01N 31/06 422/28 |

FOREIGN PATENT DOCUMENTS

| | | | |
|---|---|---|---|
| EP | 1303661 | A1 | 4/2003 |
| EP | 1687136 | A2 | 8/2006 |
| EP | 1861529 | A1 | 12/2007 |
| EP | 2843034 | A1 | 3/2015 |
| WO | 99/18180 | A1 | 4/1999 |
| WO | 99/53006 | A1 | 10/1999 |
| WO | 2004/067194 | A2 | 8/2004 |
| WO | 2004/104147 | A1 | 12/2004 |
| WO | 2017/174959 | A1 | 10/2017 |
| WO | 2020/198853 | A1 | 10/2020 |

OTHER PUBLICATIONS

DfE-Certified Disinfectants, US Environmental Protection Agency, May 30, 2023, 2 pages, https://www.epa.gov/pesticide-labels/dfe-certified-disinfectants, May 31, 2023.

Ferhout et al., Antifungal Activity of Selected Essential Oils, Cinnamaldehyde and Carvacrol against Malassezia furfur and Candida albicans., Jan. 1, 1999, Journal of Essential Oil Research, 119-129, vol. 11, Issue 1.

Gilling et al., Antiviral efficacy and mechanisms of action of oregano essential oil and its primary component carvacrol against murine norovirus, Nov. 5, 2013, Journal of Applied Microbiology, 1149-1163.

Igara Oliveira Lima et al., Antifungal activity and mode of action of carvacrol against Candida albicans strains, Oct. 24, 2012, The Journal of Essential Oil Research, 138-142, vol. 25, No. 2.

Office of Pesticide Programs, US EPA, Standard Operating Procedure for disinfectant Towelette Test: Testing of *Staphylococcus aureus*, Pseudomonas aeruginosa, and *Salmonella enterica*, Feb. 11, 2016, 19 pages, https://www.epa.gov/sites/default/files/2016-05/documents/mb-09-06.pdf, May 31, 2023.

Safer Choice Standard and Criteria, Environmental Protection Agency, 14 pages, https://www.epa.gov/saferchoice/standard, May 31, 2023.

US EPA, Standard Operating Procedure for OECD Quantitative Method for Evaluating Bactericidal and Mycobactericidal Activity of Microbicides Used on Hard, Non-Porous Surfaces, 28 pages, https://www.epa.gov/pesticide-analytical-methods/antimicrobial-testing-methods-procedures-mb-25-05, May 31, 2023.

* cited by examiner

DISINFECTING FORMULATIONS WITH CARVACROL

CROSS REFERENCE TO RELATED APPLICATIONS

The present application claims the benefit of U.S. Provisional Patent Application Ser. No. 63/323,379, filed on Mar. 24, 2022, the disclosure of which is incorporated by reference in its entirety.

BACKGROUND OF THE INVENTION

1. The Field of the Invention

The present invention relates generally to disinfecting, sanitizing, or other cleaning compositions including carvacrol. The inventive cleaning compositions have a limited number of ingredients, e.g., avoiding commonly used disinfection or sanitizing agents (e.g., bleaches, quats, etc.), but rather achieve sanitization or disinfection specifically through inclusion of carvacrol. The inventive cleaning compositions can take a variety of forms, such as: disinfecting wipes, all-purpose disinfecting sprays, kitchen cleaners, bathroom cleaners, toilet cleaners, laundry and soft surface cleaning compositions, hand sanitizers, air disinfection (e.g., aerosol/misting sprayer or nebulizer), or the like.

2. Description of Related Art

Consumers have access to more information than ever before on the properties of the ingredients used in household cleaning products. This access is clearly driving concerns about the relative safety and effects, both chronic and acute, of ingredients on human health. Thus there is growing preference for cleaning products which are perceived as safer in use, but can still provide antimicrobial (germicidal) efficacy in cleaning and the sanitization or disinfection of the surfaces cleaned.

The formulations should deliver effective sanitization or disinfection of the surfaces where this germicidal performance is evaluated by protocols acceptable to a regulatory agency such as the U.S. Environmental Protection Agency (EPA). This means the formulations are tested for efficacy via protocols that include dispensing from the intended container, for example a spray bottle, or loaded onto a wipe, etc., abrasion of a known, regulated level of microorganisms dried on a surface, and evaluation of the variability of the germicidal effects across multiple replicate contaminated surfaces. For example, a suitable antimicrobial testing protocol could require testing 60 carriers with the formulation, within a regulated time of contact, such as contact times of 10 minutes or less, or 5 minutes or less, etc.

The inventive formulations may use ingredients that are highly preferred, based on published technical criteria set by one or more regulatory agencies concerned with the effects of cleaning solutions on both consumers and the environment. To date, there is not yet global harmonization on the list of ingredients for sanitizing and disinfecting formulations that are considered preferred for environmental and consumer safety. In the US, however, the EPA lists formula criteria and chemical ingredients which are preferred. In addition, within the US, certain states, such as California, have enacted regulations on the use of certain "volatile organic compounds" (VOCs) in cleaning products, in efforts to reduce environmental impacts of commonly used cleaning products. In some embodiments of the invention, all of the components or substantially all components of the inventive compositions meet the EPA guidelines under CFR 180.940(a) which reflect a presumption of low toxicity. There is a need for efficacious cleaning compositions that deliver effective sanitization or disinfection of the surfaces which are free from less preferred germicidal compounds, including: quaternary ammonium compounds, biguanides, oxidants (e.g., peroxides or hypohalites), triclosan, triclocarban, iodine and fluorosufactants, to name a few.

Prior art formulations that do provide a sanitizing or disinfecting benefit typically rely on the inclusion of one or more antimicrobial constituents, such as known cationic quaternary ammonium compounds or oxidants (e.g., peroxides or hypohalites). Quaternary ammonium compounds are well known to be effective against gram positive type pathogenic bacteria such as *Staphylococcus aureus*, and/or gram negative type pathogenic bacteria such as *Salmonella choleraesuis* and/or *Pseudomonas aeruginosa*. In an embodiment, the present compositions are free from such antimicrobial constituents including: biguanides, triclosan, triclocarban, quaternary ammonium compounds, ammonia, peroxides, peracetic acid, hypochlorite, other hypohalites, or hypochlorous acid. In general, the inclusion of many such antimicrobial constituents is often not without one or more detriments including, but not limited to specific formulation limitations, irritation concerns (skin and/or eye irritation), unpleasant or harsh odor, surface compatibility limitations, and the like.

Quaternary ammonium compounds are commonly used in disinfecting and sanitizing products because of their lower potential to damage surfaces versus peroxides or hypohalites, yet have broad spectrum microefficacy. Unfortunately, demand has surged for these compounds and products containing them during the recent COVID-19 pandemic. As a result, shortages exist for key precursors to these compounds, such as tertiary amines and alkyl benzyl chlorides. At least some embodiments of the present inventive compositions do not use these precursors to obtain broad spectrum microefficacy, and thus provide critical additional antimicrobial capacity for bleach-free, quat-free disinfection and sanitization for healthcare facilities, commercial spaces, and consumer usage on inanimate and other surfaces in and outside the home.

BRIEF SUMMARY

The present invention is directed to cleaning compositions that include carvacrol, in an amount sufficient to provide an antimicrobial effect. For example, the compositions can include at least 0.1%, at least 0.2%, at least 0.3%, or at least 0.5%, such as 0.1% to 2% by weight of carvacrol. The composition may also include one or more anionic surfactants, such as at least 0.1%, at least 0.2%, at least 0.3%, or at least 0.5%, such 0.5% to 5% by weight of one or more anionic surfactants. In some embodiments a buffer may be present, e.g. 0.1% to 1% by weight of a buffer. The vast majority of the composition, e.g., 85% to 99% may comprise water. The compositions may have a relatively high pH, such as at least 9, at least 10, at least 10.5 or at least 11 (e.g., 9 to 12). The cleaning composition may exhibit a significant log reduction (e.g., at least 2 log, at least 3 log, at least 4 log, at least 5 log, or at least 6 log) against a target microorganism (e.g., *Staphylococcus aureus*) within a given period (e.g., 10 minutes, 5 minutes, or the like), when used on a target surface. In an embodiment, the composition may consist of, or consist essentially of the above such components. Where such is the case, the composition may optionally further include one or more adjuncts selected from the group consisting of pH adjusters, solvents, sequestrants or chelating agents, fragrances or perfumes, dyes and/or colorants, builders, defoamers, thickeners, hydrotropes, antimicrobial compounds, preservatives, solubilizing materials, stabilizers, lotions and/or mineral oils, enzymes, cloud point modifiers, and any combinations or mixtures thereof.

Another exemplary composition may include 0.1% to 2% by weight of carvacrol, 0.1% to 3% by weight of a first anionic surfactant, 0.1% to 3% by weight of a second anionic surfactant, and 85% to 99% water. The cleaning composition may have a pH as noted, e.g., such as from 9 to 12, and may exhibit a significant log reduction, such as at least 2, at least 3, at least 4, at least 5 or at least 6 against a target population (e.g., *Staphylococcus aureus*) within a given time period (e.g., within 10 minutes, or within 5 minutes) on a target surface. In an embodiment, the composition may consist of, or consist essentially of the above such components. Where such is the case, the composition may optionally further include one or more adjuncts as noted above.

Another exemplary cleaning composition includes 0.1% to 2% by weight of an antimicrobial agent (i.e., carvacrol) which is a liquid at ambient temperature (20-25° C.), and which has the following structure.

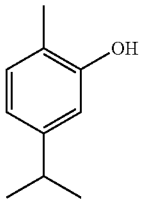

The composition may further include 0.1% to 3% by weight of a first anionic surfactant, 0.1% to 3% by weight of a second anionic surfactant, and 85% to 99% water. In an embodiment, the composition may consist of, or consist essentially of the above such components. Where such is the case, the composition may optionally further include one or more adjuncts as noted above.

In an embodiment, the cleaning composition may comprise at least 90%, or at least 95% water by weight (e.g., 90%-99% water, or 95-99% water).

In an embodiment, the anionic surfactant included in the cleaning composition comprises an alkyl sulfate (e.g., a $C_8$-$C_{12}$ alkyl sulfate). More than one alkyl sulfate may be included (e.g., two or more alkyl sulfates, of different chain lengths). Applicant has found that various other common classes of surfactants, (e.g., amine oxides, alcohol ethoxylates, alkylpolyglycosides, to name a few) actually interfere with the antimicrobial efficacy of the carvacrol, and thus, in an embodiment, the composition may be free, or substantially free, of one or more such surfactants.

In an embodiment, a buffer may be included. Due to the pH of the composition, alkaline buffers may be particularly suitable. Examples of such buffers (which may actually enhance performance) include carbonates, silicates, and/or citrates.

As noted above, in an embodiment, the composition has a high pH, e.g., of at least 9, at least 9.5, at least 10, at least 10.5, or at least 11, such as from 9 to 13, from 9 to 12, from 10 to 12, from 10.5 to 12, or from 11 to 12. Exemplary pH values may include 9, 9.5, 10, 10.5, 11, 11.5, 12, 12.5, 13, or any values therebetween.

In an embodiment, a chelating agent may be included. Examples of such include, but are not limited to aminocarboxylate salts, such as salts of methylglycinediacetic acid (MGDA), salts (e.g., a tetra sodium salt) of glutamic acid diacetic acid (GLDA), salts (e.g., a trisodium salt) of alanine, N,N-bis(carboxymethyl), EDTA salts, a citrate salt (e.g., sodium citrate), and/or a salt of glucaric acid.

In an embodiment, the composition may be free, or substantially free of thymol, and/or other essential oil compounds (e.g., one or more of alpha-terpineol, beta-citronellol, camphor, carveol, carvone, eucalyptol, eugenol, geraniol, hexadiol, m-isoeugenol, menthol, phenol, terpinen-4-ol, thymol, hydroxyacetophenone, alpha-pinene, limonene, linalool, p-cymene, others mentioned herein, and the like). While some such compounds may be compatible with the carvacrol compositions as will be shown by the data included herein, others of such compounds interfere with antimicrobial efficacy of the carvacrol. Thus, in an embodiment, the compositions may be free, or substantially free of one or more such essential oil compounds, other than carvacrol.

In an embodiment, the composition (or the composition as released from a wipe, or otherwise delivered) provides at least a 2-log, 3-log, 4-log, 5-log, or 6-log reduction against a target microbe within 10 minutes, 8 minutes, 5 minutes, 4 minutes or 3 minutes. Exemplary target microbes include, but are not limited to *Staphylococcus aureus, Pseudomonas aeruginosa, Listeria monocytogenes, E. coli*, and *Salmonella enteritidis*. Where the composition is used for air disinfection or sanitization (e.g., using a nebulizer or the like), contact times may typically be longer, e.g., such as within 120 minutes, within 90 minutes, within 60 minutes, or within 30 minutes to achieve a desired log reduction.

Another aspect of the current invention is a concentrated composition that yields compositions as described above or elsewhere herein, upon dilution per use instructions. The inventive cleaning compositions can take a variety of forms, examples of which include, but are not limited to: disinfecting wipes, all-purpose disinfecting sprays, kitchen cleaners, bathroom cleaners, toilet cleaners, laundry and soft surface cleaning compositions, hand sanitizers, air disinfection (e.g., aerosol/misting sprayer or nebulizer), or the like.

The inventive compositions have low toxicity, good cleaning performance, offering sanitization or disinfection without reliance on typical antimicrobial agents, such as quats, bleach, or high alcohol concentrations. The inventive cleaning compositions are effective at sanitizing or disinfecting surfaces and can be used on a variety of hard surfaces, with little if any concerns relative to surface compatibility (which is a problem for many sanitizing compositions that rely on hypohalites), skin safety (which is a problem for compositions that rely on quaternary ammonium compounds).

The compositions may differ from those of U.S. Pat. No. 9,609,864 in that they do not include the solvents listed (e.g., see col. 6 lines 21-25). The compositions may differ from those of U.S. Pat. Nos. 6,346,281 and 6,846,498 in that they do not include the solvents listed (e.g., see col. 2 lines 54-57 of '281) or copper sulfate or other transition metal ions) (e.g., see col. 3 lines 8-18 of '498). The compositions may differ from those of U.S. Pat. No. 8,147,877 in that they do not include transition metals (e.g., see col. 2 lines 58-60). The compositions may differ from those of U.S. Pat. No. 8,691,292 in that they do not include the solvents listed (e.g., see col. 6 lines 20-26). The compositions may differ from those of WO2020/0198853 in that they do not include the solvents listed (e.g., see p. 20), sorbate (pp. 24-25), or saponin (pp. 26-29). The compositions may differ from those of U.S. Pat. No. 9,271,492 in that they do not include menthadiene alcohols, or thymol (e.g., see cols. 5-8).

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

DETAILED DESCRIPTION OF THE PREFERRED EMBODIMENTS

I. Definitions

Figure 1:
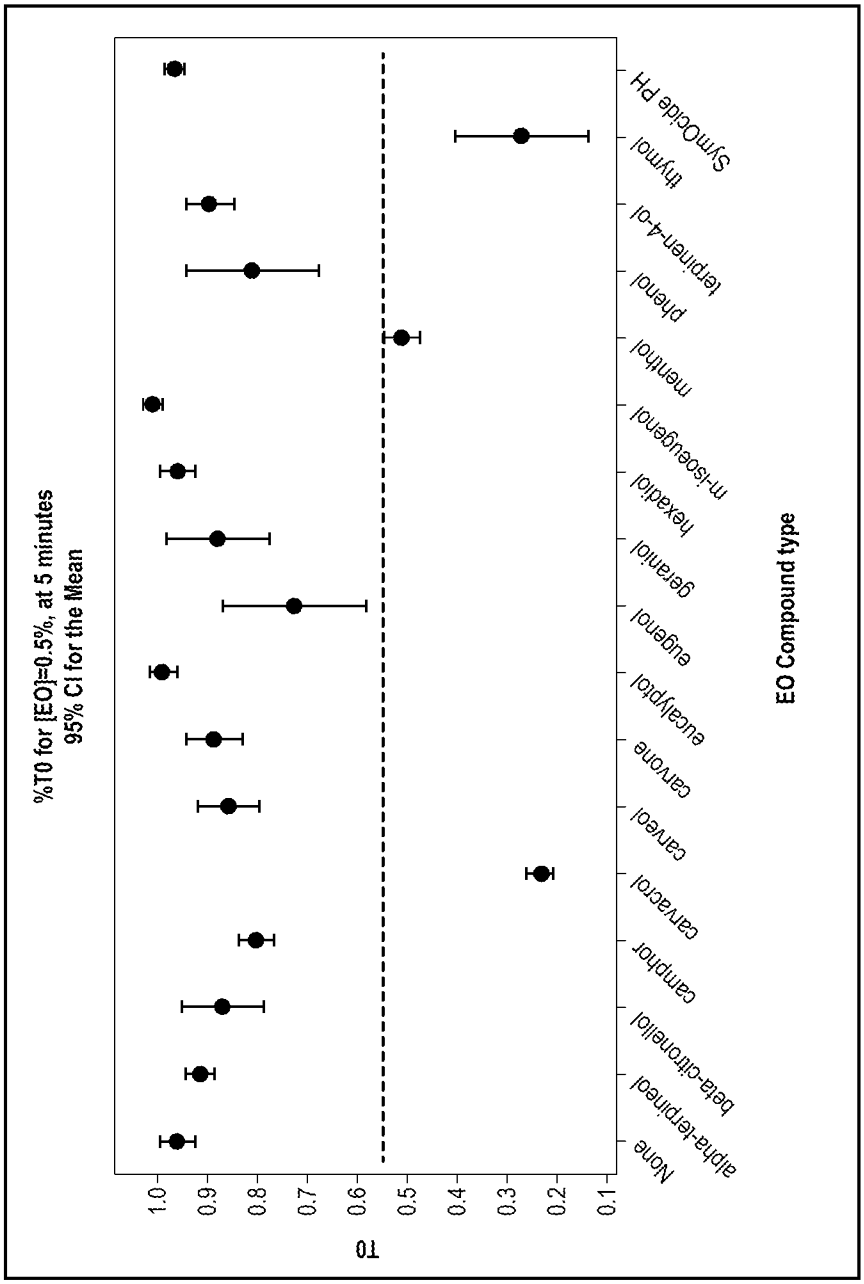
FIG. 1 shows normalized T0 (related to light absorption vs. transmission level) for various essential oil compounds tested in a minimum inhibiting concentration test, illustrating the relative potential of various candidate essential oil compounds. Lower T0 values are desirable, corresponding to increased inhibitory effect.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

As used herein, the term "between" is inclusive of any endpoints noted relative to a described range.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications (e.g., including but not limited to personal care wipes, skin care and cosmetics products). Such substrates may typically be in the form of a wipe.

Such substrates may be formed of a structure of individual fibers which are interlaid, typically in a manner that is not identifiable (e.g., a nonwoven). The nonwoven substrates, or layers used to make up such a nonwoven substrate included in the present substrates may be formed by any suitable process. For example, they may be meltblown, spunbond, spunlaid, SMS (spunbond-meltblown-spunbond), coformed, carded webs, thermal bonded, thermoformed, spunlace, hydroentangled, hydroembossed, needled, or chemically bonded. Various processes for forming such nonwovens will be apparent to those of skill in the art, many of which are described in U.S. Pat. No. 7,696,109, incorporated herein by reference in its entirety. EP Applications EP992338, EP1687136, EP1861529, EP1303661, and US2004/0157524 are also herein incorporated by reference, each in its entirety.

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization, other cleaning, or other treatment. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 120 minutes, within 90 minutes, within 60 minutes, within 30 minutes, within 10 minutes, within 5 minutes, within 4 minutes, within 3 minutes, within 2 minutes, within 1 minute), when sanitizing or disinfecting.

As used herein, the term "disinfect" shall mean the elimination of many or all "target" pathogenic microorganisms on surfaces with the exception of bacterial endospores.

As used herein, the term "sterilize" shall mean the complete elimination or destruction of all forms of "target" microbial life and which is authorized under the applicable regulatory laws to make legal claims as a "sterilant" or to have sterilizing properties or qualities.

Some embodiments may provide for at least a 2 or more log reduction (e.g., 3-log reduction, 4-log reduction, 5-log reduction, or 6-log reduction) in a bacterial population within a designated time period (e.g., 60 minutes, 30 minutes, 10 minutes, 5 minutes, 4 minutes, 3 minutes, 2 minutes, 1 minute, 30 seconds, or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that antimicrobial efficacy can also be achieved against other target microbes, numerous examples of which will be apparent to those of skill in the art.

As used herein, the term "cleaning composition", as used herein, is meant to mean and include a cleaning formulation having at least one surfactant.

As used herein, the term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, cationic, nonionic, zwitterionic, and/or amphoteric agents.

The term "Design for the Environment" or "DfE" means the U.S. EPA program that is focused on identifying safer sanitizing and disinfecting active ingredients. The EPA has a special approval process for products that met the DfE criteria. The EPA, as part of the DfE program has identified certain active ingredients that are approved for antimicrobial cleaning products and authorized to use the DfE logo. The antimicrobial cleaning products that have been approved under the DfE program may be found under https:/www.epa.gov/pesticide-labels/design-environment-logo-antimicrobial-pesticide-products#authorizeddfe. All products approved for DfE program must have ingredients that meet the "Safer Choice Standard" according to https://www.epa.gov/pesticide-labels/design-environment-logo-antimicrobial-pesticide-products#approved. In an embodiment, the present compositions could be formulated to meet DfE guidelines.

The term "food contact surface" means as defined by the EPA and/or FDA. For example, the FDA defines the term in its "Food Code" 1-201.10 as (1) a surface of equipment or a utensil with which food normally comes into contact; or (2) a surface of equipment or a utensil from which food may drain, drip, or splash (a) into a food, or (b) onto a surface normally in contact with food. In an embodiment, the present compositions could be formulated to be safe for use on food contact surfaces (e.g., without rinsing).

In reference to various standardized tests (e.g., any ASTM or other tests), it will be understood that reference to any such standard refers to the latest update (if any) of such standard, unless otherwise indicated. Any such referenced standards are incorporated herein by reference, in their entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention is directed to cleaning compositions that include carvacrol, in an amount sufficient to provide an antimicrobial effect. For example, the compositions can include 0.1% to 2% by weight of carvacrol. The cleaning compositions advantageously further include a surfactant, particularly an anionic surfactant, which has been found by Applicant to enhance the antimicrobial efficacy characteristics of the carvacrol. For example, the composition can include at least 0.1%, at least 0.3%, or at least 0.5% of one or more anionic surfactants. Alkyl sulfates (e.g., $C_8$ to $C_{12}$ alkyl sulfates) have been found to be particularly suitable. A buffer may also be present. The compositions may have a relatively high, alkaline pH, e.g., such as at least 9, at least 10, at least 10.5 or at least 11 (e.g., 9 to 12 or 10.5 to 12). The cleaning composition may exhibit a significant log reduction (e.g., at least 2 log, at least 3 log, at least 4 log, at least 5 log, or at least 6 log) against a target microorganism (e.g., *Staphylococcus aureus* and/or others) within a given time period (e.g., 60 minutes, 30 minutes, 10 minutes, 5 minutes, or the like), when used on a target surface.

Advantageously, the compositions may be free or substantially free of conventional antimicrobial agents, such as quaternary amines, hypohalites, peroxides, high concentrations of ethanol or similar lower ($C_1$-$C_4$) alcohols, organic acids (e.g., citric acid) and the like. The compositions exhibit minimal or no undesirable odor and excellent surface compatibility (e.g., shortcomings associated with hypohalite bleaches), low skin irritability (e.g., a shortcoming of quaternary amines), and the like. While various formulations have been proposed previously that may include thymol or another essential oil compound (e.g., menthol, eugenol, camphor, etc.), such compounds often exhibit pungent, strong odors, that can be problematic for some. Carvacrol on the other hand (i) exhibits a significantly less pungent odor, (ii) at certain levels (e.g., 0.25% or less) it can provide antimicrobial efficacy, (iii) it is compatible with fragrance components, and (iv) it is a liquid at ambient temperature, making its incorporation into the present compositions simpler than what is required for a solid compound, such as thymol.

III. Cleaning Composition

A. Water

In an embodiment, the cleaning composition is an aqueous composition, including at least 70%, at least 80%, at least 85%, at least 90%, or at least 95% water by weight (e.g., 85% to 99% water).

B. Carvacrol

Carvacrol is an organic compound that can be separated from various essential oil sources (e.g., oregano). Carvacrol has the chemical structure shown below.

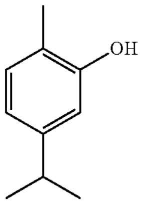

Although very similar in structure to thymol, carvacrol has properties that differ significantly from thymol. For example, while carvacrol melts at about 1° C., thymol does not melt until about 50° C. As such, carvacrol is a liquid at ambient temperature, but thymol is a solid. Carvacrol also exhibits significantly different solubility characteristics in water, as compared to thymol. As already noted, there is a significant difference in odor characteristics between the two compounds, as well. The present compositions rely on inclusion of carvacrol, rather than thymol. Indeed, in at least some embodiments, thymol may be absent from the present compositions. The present embodiments include an antimicrobial effective amount of carvacrol. For example, the carvacrol may be included in an amount of at least 0.1%, at least 0.2%, at least 0.3%, or at least 0.5%, up to 5%, 3%, or 2%, such as from 0.5% to 2%. Exemplary amounts, or endpoints of a desired range, may include 0.1%, 0.2%, 0.3%, 0.4%, 0.5%, 0.6%, 0.7%, 0.8%, 0.9%, 1%, 1.25%. 1.5%, 1.75%, 2%, 2.5%, 3%, 3.5%, 4%, 4.5%, or 5% by weight of the cleaning composition.

As shown herein, carvacrol exhibits broad spectrum antimicrobial properties. In an embodiment, carvacrol is the only included antimicrobial agent. For example, no organic acids, other essential oil compounds, hypohalites, peroxides, quaternary amines, biguanides, or other antimicrobial agents may be included.

B. Solvents

Other than water, the composition does not require a solvent. That said, in an embodiment, solvents other than water may optionally be present. Examples of solvents that could be included (or excluded) are described herein. An exemplary solvent may be a glycol ether. Exemplary glycol ether solvents include, but are not limited to, ethylene glycol monopropyl ether, ethylene glycol monobutyl ether, ethylene glycol monohexyl ether, ethylene glycol phenyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and/or propionate esters of glycol ethers. Where present, a solvent may be included from 0.1%, from 0.25%, up to 5%, up to 4%, up to 3%, up to 2%, or up to 1% by weight of the cleaning composition. While both lower alcohols (e.g., $C_1$-$C_4$ alcohols) and higher chain length alcohols (e.g., $C_5$ and higher, such as $C_6$ to $C_{16}$, $C_8$ to $C_{12}$, $C_{10}$, etc.) may sometimes be used as solvents, their absence (particularly lower alcohols) can be beneficial in minimizing the presence of VOC components, as well as for other reasons. If present, the amount of such volatile solvents may be limited, e.g., to less than 5%, less than 3%, less than 2%, less than 1%, less than 0.5%, less than 0.3%, less than 0.2%, less than 0.1%, less than 0.05%, or less than 0.01% by weight.

C. Surfactants

Those of skill in the art will appreciate that a wide variety of surfactants (e.g., anionic, cationic, non-ionic, zwitterionic, and/or amphoteric) are often included in various cleaning compositions. In the present compositions, anionic surfactants, such as alkyl sulfates (and perhaps other anionic surfactants), have been found to be particularly compatible with carvacrol at high pH values, as a cleaning composition with antimicrobial efficacy. Where included, a surfactant may be present from 0.05%, from 0.1%, up to 10%, up to 5%, up to 4%, up to 3%, up to 2%, or up to 1% by weight of the cleaning composition.

Non-limiting examples of anionic surfactants that may be suitable for use in the present compositions include alkyl sulfates (e.g., $C_8$-$C_{18}$ or $C_8$-$C_{12}$ linear or branched alkyl sulfates such as sodium lauryl sulfate (SLS), sodium n-octyl sulfate and sodium tetradecylsulfate), alkyl sulfonates (e.g., $C_6$-$C_{18}$ or $C_8$-$C_{12}$) linear or branched alkyl sulfonates such as sodium octane sulfonate and secondary alkane sulfonates, alkyl ethoxysulfates, fatty acids and fatty acid sulfate or sulfonate salts (e.g., $C_6$-$C_{16}$ fatty acid soaps such as sodium laurate), and alkyl amino acid derivatives. Other examples may include sulfate derivatives of alkyl ethoxylate propoxylates, alkyl ethoxylate sulfates, alpha olefin sulfonates, $C_6$-$C_{16}$ acyl isethionates (e.g. sodium cocoyl isethionate), $C_6$-$C_{18}$ alkyl, aryl, or alkylaryl ether sulfates, $C_6$-$C_{18}$ alkyl, aryl, or alkylaryl ether methyl-sulfonates, $C_6$-$C_{18}$ alkyl, aryl, or alkylaryl ether carboxylates, sulfonated alkyldiphenyloxides (e.g. sodium dodecyldiphenyloxide disulfonate), and the like.

In an embodiment, the present composition includes first and second anionic surfactants, e.g., two alkyl sulfates of different chain lengths. By way of example, some embodiments may include a first anionic surfactant (e.g., SLS, a $C_{12}$ alkyl sulfate), and a second anionic surfactant (e.g., sodium n-octyl sulfate, a $C_8$ alkyl sulfate).

The inclusion of two such anionic surfactants can result in a desirable interaction between two such surfactants, in the presence of carvacrol, to disrupt the cell membrane around a target microbe, and/or to change the micelle size, allowing delivery of a higher localized concentration of the carvacrol, to more efficiently kill a target microbe.

Although various other classes (e.g., nonionic, cationic, zwitterionic, and/or amphoteric) of surfactants are often included in cleaning compositions, in an embodiment, the primary surfactant is an anionic surfactant. Various other classes of surfactants may be included, as a secondary surfactant, or excluded altogether. Various surfactants and other optional adjuvants are disclosed in U.S. Pat. No. 3,929,678 to Laughlin and Heuring, U.S. Pat. No. 4,259,217 to Murphy, U.S. Pat. No. 5,776,872 to Giret et al.; U.S. Pat. No. 5,883,059 to Furman et al.; U.S. Pat. No. 5,883,062 to Addison et al.; U.S. Pat. No. 5,906,973 to Ouzounis et al.; U.S. Pat. No. 4,565,647 to Llenado, and U.S. Publication No. 2013/0028990. The above patents and applications are each herein incorporated by reference in their entirety.

In an embodiment, the present compositions may avoid nonionic surfactants. Examples of nonionic surfactants include, but are not limited to, alcohol ethoxylates, alcohol propoxylates, other alcohol alkoxylates including fatty (e.g., $C_6$, $C_8$, $C_{10}$, or $C_{12}$, or higher) alcohols or other constituents that have been alkoxylated to include both ethoxy and propoxy groups (EO-PO surfactants), alkyl phosphine oxides, alkyl glucosides and alkyl pentosides, alkyl glycerol esters, alkyl ethoxylates, and alkyl and alkyl phenol ethoxylates of all types, poly alkoxylated (e.g. ethoxylated or propoxylated) $C_6$-$C_{12}$ linear or branched alkyl phenols, $C_6$-$C_{22}$ linear or branched aliphatic primary or secondary alcohols, and $C_2$-$C_8$ linear or branched aliphatic glycols. Block or random copolymers of $C_2$-$C_6$ linear or branched alkylene oxides may also be suitable nonionic surfactants. Capped nonionic surfactants in which the terminal hydroxyl group is replaced by halide; $C_1$-$C_8$ linear, branched or cyclic aliphatic ether; $C_1$-$C_8$ linear, branched or cyclic aliphatic ester; phenyl, benzyl or $C_1$-$C_4$ alkyl aryl ether; or phenyl, benzyl or $C_1$-$C_4$ alkyl aryl ester may also be used. Sorbitan esters and ethoxylated sorbitan esters are additional examples of nonionic surfactants. Other nonionic surfactants may include mono or polyalkoxylated amides of the formula $R^1CONR^2R^3$ and amines of the formula $R^1NR^2R^3$ wherein $R^1$ is a $C_5$-$C_{31}$ linear or branched alkyl group and $R^2$ and $R^3$ are $C_1$-$C_4$ alkyl, $C_1$-$C_4$ hydroxyalkyl, or alkoxylated with 1-3 moles of linear or branched alkylene oxides. Biosoft 91-6 (Stepan Co.) is an example of an alkyl ethoxylate (or alcohol ethoxylate) having a methylene chain length of $C_9$ to $C_{11}$ with an average of 6 moles of ethoxylation. An example of an alcohol ethoxylate is ECOSURF EH-9, which is more specifically an ethylene oxide-propylene oxide copolymer mono(2-ethylhexyl) ether, available from Dow.

Alkylpolysaccharide nonionic surfactants are disclosed in U.S. Pat. No. 4,565,647 to Llenado, having a linear or branched alkyl, alkylphenyl, hydroxyalkyl, or hydroxyalkylphenyl group containing from 6 to 30 carbon atoms and a polysaccharide, e.g., a polyglycoside, hydrophilic group containing from 1.3 to 10 saccharide units. Suitable saccharides may include, but are not limited to, glucosides, galactosides, lactosides, and fructosides. Alkylpolyglycosides may have the formula: $R^2O(CnH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 10.

Fatty acid saccharide esters and alkoxylated fatty acid saccharide esters are additional examples of nonionic surfactants. Examples include, but are not limited to, sucrose esters, such as sucrose cocoate, and sorbitan esters, such as polyoxyethylene(20) sorbitan monooleate and polyoxyethylene(20) sorbitan monolaurate.

Phosphate ester surfactants are another example of nonionic surfactants. These include mono, di, and tri esters of phosphoric acid with $C_4$-$C_{18}$ alkyl, aryl, alkylaryl, alkyl ether, aryl ether and alkylaryl ether alcohols (e.g. disodium octyl phosphate).

Zwitterionic surfactants include both a positive and negative functional group, and may therefore also be classified as nonionic surfactants. Many such zwitterionic surfactants contain nitrogen. Examples of such include amine oxides, sarcosinates, taurates and betaines. Examples include $C_8$-$C_{18}$ alkyldimethyl amine oxides (e.g., octyldimethylamine oxide, lauryldimethylamine oxide (also known as lauramine oxide), and cetyldimethylamine oxide), $C_4$-$C_{16}$ dialkylmethylamine oxides (e.g. didecylmethyl-amine oxide), $C_8$-$C_{18}$ alkyl morpholine oxide (e.g. laurylmorpholine oxide), tetra-alkyl diamine dioxides (e.g. tetramethyl hexane diamine dioxide, lauryl trimethyl propane diamine dioxide), $C_8$-$C_{18}$ alkyl betaines (e.g. decylbetaine and cetylbetaine), $C_8$-$C_{18}$ acyl sarcosinates (e.g. sodium lauroylsarcosinate), $C_8$-$C_{18}$ acyl $C_1$-$C_6$ alkyl taurates (e.g. sodium cocoylmethyltaurate), $C_8$-$C_{18}$ alkyliminodipropionates (e.g. sodium lauryliminodipropionate), and combinations thereof. Lauryl dimethyl amine oxide (Ammonyx LO) myristyl dimethyl amine oxide (Ammonyx MO), decylamine oxide (Ammonyx DO) are examples of zwitterionic amine oxide surfactants, available from Stepan Co.

D. Buffers

Because the present cleaning compositions exhibit relatively high pH, inclusion of an alkaline buffer can be helpful, to maintain the pH within a desired range. Many antimicrobial compositions require low pH in order to be effective. The present compositions differ significantly in this respect, as they have an alkaline pH, e.g., of at least 9, 9.5, 10, 10.5, or 11, such as 10.5 to 13, or 10.5 to 12, or 11 to 12. pH may be adjusted by inclusion of a suitable pH adjuster, such as sodium hydroxide. Suitable buffers include those that would exhibit pKa values near the desired target pH (e.g., within a value of about 1 pH point of the desired target pH). In one embodiment, buffers may include, but are not limited to, alkali metal or alkaline earth salts of citrate, silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and/or 2-amino-2methylpropanol. Silicates, carbonates, and citrates may be particularly suitable.

Additional examples of buffering agents may include nitrogen-containing materials (e.g., lysine; lower alcohol amines like mono-, di-, and tri-ethanolamine; tri(hydroxymethyl) amino methane; 2-amino-2-ethyl-1,3-propanediol; 2-amino-2-methyl-propanol; 2-amino-2-methyl-1,3-propanol; disodium glutamate; methyl diethanolamide; 2-dimethylamino-2-methylpropanol; 1,3-bis(methylamine)-cyclohexane; 1,3-diamino-propanol N,N'-tetra-methyl-1,3-diamino-2-propanol; N,N-bis(2-hydroxyethyl)glycine; tris (hydroxymethyl)methyl glycine; ammonium carbamate; ammonia). For additional information relative to buffers, see McCutcheon's EMULSIFIERS AND DETERGENTS, North American Edition, 1997, McCutcheon Division, MC Publishing Company, which is incorporated herein by reference.

E. Additional Adjuvants

The cleaning composition may optionally include and/or be used in combination with one or more additional adjuncts. The adjuncts include, but are not limited to, pH adjusters, solvents, sequestrants or chelating agents, fragrances or perfumes, dyes and/or colorants, builders, defoamers, thickeners, hydrotropes, antimicrobial compounds, preservatives, solubilizing materials, stabilizers, lotions and/or mineral oils, enzymes, cloud point modifiers and mixtures or combinations thereof. A more limited listing of typical optional adjuncts may include pH adjusters, solvents, sequestrants or chelating agents, fragrances or perfumes, builders, defoamers, thickeners, hydrotropes, antimicrobial compounds, preservatives, and mixtures or combinations thereof.

A variety of builder detergents can be used in and/or used in combination with the cleaning composition. Such builder detergents include, but are not limited to, phosphate-silicate compounds, zeolites, alkali metal, ammonium and substituted ammonium polyacetates, mono-, di-, and tri-alkali salts of nitrilotriacetic acid, carboxylates, aluminosilicate materials, silicates, polycarboxylates, zeolites, carbonates, phosphates, bicarbonates, polyphosphates, amines, alkanolamines, aminopolycarboxylates, polyhydroxysulfonates, starch derivatives, ethylenediamine tetraacetate, and/or metal ion sequestrants (e.g., aminopolyphosphonates such as, but not limited to, ethylenediamine tetramethylene phosphonic acid and diethylene triamine pentamethylenephosphonic acid).

In one embodiment, a builder detergent includes polyacetate and/or polycarboxylate compounds. In one aspect of this embodiment, the polyacetate and/or polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, glucaric acid and citric acid.

In yet another and/or alternative embodiment, solubilizing materials, when used, can include, but are not limited to, hydrotropes (e.g., water soluble salts of low molecular weight organic acids such as the sodium and/or potassium salts of xylene sulfonic acid). In another and/or alternative embodiment, the acids, when used, include, but are not limited to, organic hydroxy acids, citric acids, keto acid, and the like.

In still another and/or alternative embodiment, thickeners, when used, include, but are not limited to, polyacrylic acid, xanthan gum, calcium carbonate, aluminum oxide, alginates, guar gum, clays, methyl, ethyl, and/or propylhydroxycelluloses. In yet another and/or alternative embodiment, defoamers, when used, include, but are not limited to, silicones, aminosilicones, silicone blends, and/or silicone/hydrocarbon blends. Preservatives, when used, include, but are not limited to, mildewstats or bacteriostats, methyl, ethyl and propyl parabens, bisguanidine compounds (e.g., Dantagard and/or Glydant) and/or short chain (i.e., lower) alcohols (e.g., ethanol and/or IPA). In one aspect of this embodiment, the mildewstats or bacteriostats include, but are not limited to, mildewstats (including non-isothiazolone compounds) and include Kathon GC, a 5-chloro-2-methyl-4-isothiazolin-3-one, Kathon ICP, a 2-methyl-4-isothiazolin-3-one, and a blend thereof, and Kathon 886, a 5-chloro-2-methyl-4-isothiazolin-3-one, all available from Rohm and Haas Company; Bronopol, a 2-bromo-2-nitropropane-1,3-diol, from Boots Company Ltd.; Proxel CRL, a propyl-p-hydroxybenzoate, from ICI PLC; Nipasol M, an o-phenyl-phenol, Na+ salt, from Nipa Laboratories Ltd.; Dowicide A, a 1,2-Benzoisothiazolin-3-one, from Dow Chemical Co.; and Irgasan DP 200, a 2,4,4'-trichloro-2-hydroxydiphenylether, from Ciba-Geigy A.G.

Additional non-limiting examples of cleaning composition components which may be included in the present embodiments are disclosed in U.S. Pat. Nos. 6,825,158; 8,648,027; 9,006,165; 9,234,165; 9,988,594; 10,421,929 and U.S. Publication No. 2008/003906, as well as U.S. Pat. No. 5,460,833 to Andrews et al.; U.S. Pat. No. 6,221,823 to Crisanti; U.S. Pat. No. 6,346,279 to Rochon et al.; U.S. Pat. No. 6,551,980 to Wisniewski et al.; U.S. Pat. No. 6,699,825 to Rees et al.; U.S. Pat. No. 6,803,057 to Ramirez et al.; U.S. Pat. No. 6,812,196 to Rees et al.; U.S. Pat. No. 6,936,597 to Urban; U.S. Pat. No. 7,008,600 to Katsigras et al.; U.S. Pat. No. 7,070,737 to Bains et al.; U.S. Pat. No. 7,354,604 to Ramirez et al.; U.S. Pat. No. 7,598,214 to Cusack et al.; U.S. Pat. No. 7,605,096 to Tamarchio et al.; U.S. Pat. No. 7,658,953 to Bobbert; U.S. Pat. No. 7,696,143 to McCue et al.; U.S. Pat. No. 7,915,207 to Chopskie et al.; U.S. Pat. No. 8,569,220 to Gaudrealt; U.S. Pat. No. 8,575,084 to Gaudrealt; U.S. Pat. No. 10,064,409 to Hazenkamp et al.; U.S. Pat. No. 10,076,115 to Salminen et al.; U.S. Pat. No. 10,358,624 to Mitchell et al.; U.S. Publication No. 2007/0190172 to Bobbert; PCT Publication Nos. WO 99/18180 to Raso et al.; WO 99/53006 to Masotti et al.; WO 2004/067194 to Arrigoni et al.; WO 2004/104147 to Rosiello et al.; WO 2017/174959 to Convery; and EPO Publication EP 2843034 to Nedic et al., each of which is herein incorporated by reference in its entirety.

F. Other Characteristics

As used herein the term "liquid" and "cleaning composition" includes, but is not limited to, solutions, emulsions, suspensions and so forth.

In some embodiments, it may be possible to provide a substrate in dry form, where dosing with a selected cleaning composition may occur later (e.g., by the user). In another embodiment, wipes may be dosed with a solid cleaning composition, where the user may add water to the wipes, at or shortly before the time of use, resulting in dosed wipes, ready for use. Pre-dosed wipes may be preferred, e.g., as the amount and concentrations of the components in the cleaning composition, and the loading ratio of such composition relative to the absorbent substrate can be more carefully controlled during manufacture, than may occur where the final composition may depend on the user for dilution or water addition.

With regard to pre-moistened substrates, a selected amount of liquid may be added to the container or wipes during manufacture such that the cleaning substrates contain the desired amount of liquid. The substrates are not necessarily loaded to their saturation point, but are typically loaded with the cleaning composition to some ratio less than full saturation. For example, many substrates are capable of holding about 8 to 14 times their weight in liquid. For various reasons, the substrates may be loaded at a loading ratio less than saturation, e.g., less than 8:1, less than 7:1, less than 6:1, less than 5:1, less than 4.5:1, less than 4:1, such as from 1:1 to 6:1, from 2:1 to 5:1, from 2.5:1 to 4.5:1, or from 3:1 to 4:1.

While a loaded wipe or a spray may be a particularly contemplated form in which the composition may be provided, it will be appreciated that the present cleaning compositions can take a wide variety of forms, such as: disinfecting wipes, all-purpose disinfecting sprays, kitchen cleaners, bathroom cleaners, toilet cleaners, laundry and soft surface cleaning compositions, hand sanitizers, air disinfection (e.g., aerosol/misting sprayer or nebulizer), or the like.

Where a substrate is present, it is important to understand and account for how the substrate materials affect the chemistry of the cleaning composition being dosed onto the wipes. For example, it can be important to avoid or minimize unwanted chemical interactions that may inadvertently deactivate the active agents within the cleaning composition. For example, incompatibility between components in the composition versus the substrate can occur, which would be undesirable. The composition that is released from the pre-loaded wipe is referred to as the "squozate". When components of a composition react with or bind to a substrate, the composition that is loaded onto the substrate differs from the "squozate". It is desirable that an effective amount of any given active agent not only be loaded into the wipe, but actually be released in the "squozate" from such wipe, during use. One advantage of using carvacrol as the antimicrobial agent, as compared to quaternary amines, is that quaternary amines routinely bind to anionic sites in the substrate (particularly cellulosic substrates), resulting in a need to load a higher concentration of quaternary amine into such a wipe, in order to still achieve a needed concentration in the squozate. The use of carvacrol, rather than a quaternary amine compound, eliminates or reduces such concerns.

The size and shape of the wipe can vary with respect to the intended application and/or end use of the same. The cleaning substrate can have a substantially rectangular shape of a size that allows it to readily engage standard cleaning equipment or tools such as, for example, mop heads, duster heads, brush heads, mitten shaped tools for wiping or cleaning, and so forth. In another embodiment, another shape, e.g., circular, oval, or the like) may be provided.

The wipes or other cleaning substrates may be provided pre-moistened with a cleaning composition. The wet cleaning substrates can be maintained over time in a sealable container such as, for example, within a bucket or tub with an attachable lid, sealable bags, plastic pouches (e.g., "flex packs"), canisters, jars, and so forth. Desirably the wet, stacked cleaning substrates are maintained in a resealable container. The use of a resealable container is particularly desirable when using aqueous volatile liquid compositions since substantial amounts of water or other liquid can evaporate while using the first sheets thereby leaving the remaining sheets with little or no liquid. Exemplary resealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5,595,786 to McBride et al.; the entire contents of each of the aforesaid references are incorporated herein by reference.

Typically, the disinfecting, sanitizing, or other cleaning substrates are stacked and placed in the container and the liquid subsequently added thereto, all during mass manufacturing. No matter the packaging and dosing process, once manufactured and packaged, the substrate can subsequently be used to wipe a surface. The moistened cleaning substrates can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto.

The wipes or other cleaning substrates of the present invention can be provided in a kit form, wherein a plurality of cleaning substrates and a cleaning tool are provided in a single package.

In addition to material composition and construction, wipe or other substrate dimensions can also be used to control dosing as well as provide ergonomic appeal. In one embodiment, substrate dimensions are from about 5½ inches to about 11 inches in length, and from about 5½ inches to about 11 inches in width to comfortably fit in a hand. The substrate can have dimensions such that the length and width differ by no more than about 2 inches. Larger substrates may be provided that can be used and then folded, either once or twice, so as to contain dirt within the inside of the fold and then the wipe can be re-used. Such larger substrates may have a length from about 5½ inches to about 13 inches and a width from about 10 inches to about 13 inches. Such substrates can be folded once or twice and still fit comfortably in the hand. As described above, the substrates may be sufficiently thin to have a basis weight of no more than 200 gsm, no more than 150 gsm, no more than 100 gsm, such as from 5 to 80 gsm, or from 10 to 60 gsm.

IV. Examples

Various essential oil compounds were evaluated in a minimum inhibitory concentration test (e.g., against *Staphylococcus aureus*), to evaluate the inhibiting characteristics of the various tested compounds. Referring to FIG. 1, the y-axis shows normalized T0 values, where lower values correspond to increased inhibitory effect. As shown, many of the tested compounds exhibit little if any inhibitory effect. While thymol exhibits some inhibitory effect, the variability is quite high, as shown by the confidence interval bars. Carvacrol exhibits the best inhibitory effect of the tested compounds, and exhibits little deviation within the test results, as evidenced by the short illustrated confidence interval bars. Each candidate essential oil compound active was tested at 0.5% concentration, with 1% sodium lauryl sulfate (SLS), with a 5 minute contact time. As those of skill in the art will appreciate, the testing was conducted following EPA microbiology efficacy protocols, where the candidate active to be tested is applied to an inoculum (e.g., *Staphylococcus aureus*), and after a given contact time (e.g., 5 minutes), the active being tested is neutralized (e.g., with growth media), and the treated inoculum is allowed to grow out over a period of 24 hours. After the 24 hour growth period, an automated plate reader is used to measure inoculum growth, and the results are tabulated, relative to a control standard, which was not contacted with any active. Such testing therefore allows determination of which candidate actives provide for an inhibitory effect relative to a target microbe, as well as information relative to which candidate actives may be better than others.

Figure 2:
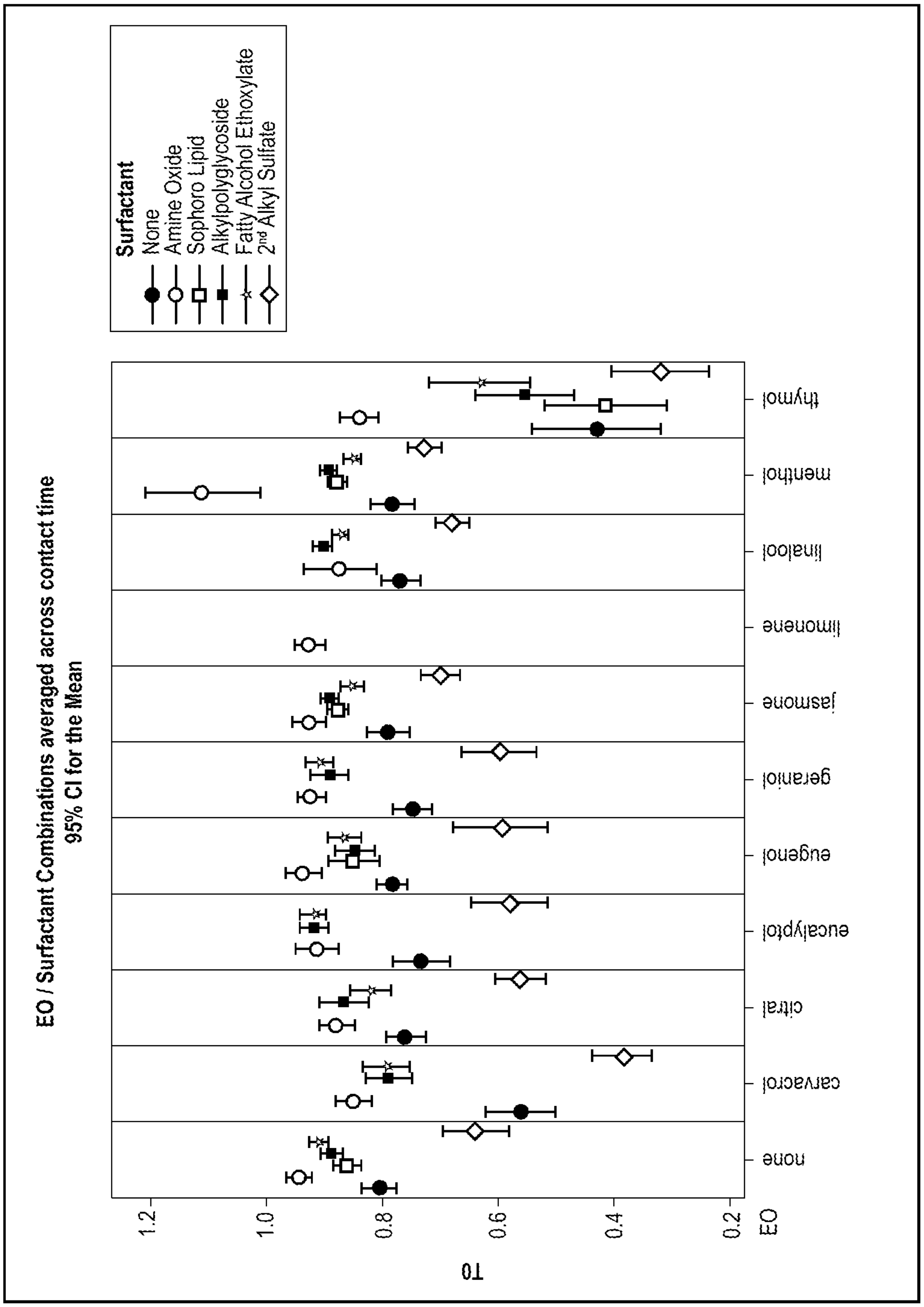
FIG. 2 shows similar normalized T0 data for combinations of candidate essential oil compounds paired with various candidate surfactants.

Based on the results seen in FIG. 1, carvacrol was identified as a good candidate for further study. FIG. 2 shows similar T0 values for various essential oil compound compositions, with different combinations of surfactants. All tested samples included 1% SLS, with 0.5% of the shown co-surfactant, and 0.2% of the shown essential oil compound, with the results averaged over 3 contact times of 5, 15, and 30 minutes. The results show an increased inhibitory effect with inclusion of a $2^{nd}$ alkyl sulfate surfactant, in addition to the SLS, particularly in combination with carvacrol. Many of the surfactants tested actually show the opposite of an inhibitory effect (i.e., they seem to promote microbe growth). For example, the amine oxide, sophorolipid, alkylpolyglycoside, and alcohol ethoxylate show such results, particularly in combination with carvacrol. For this reason, such surfactants may be avoided, in at least some embodiments of the present invention.

Figure 3:
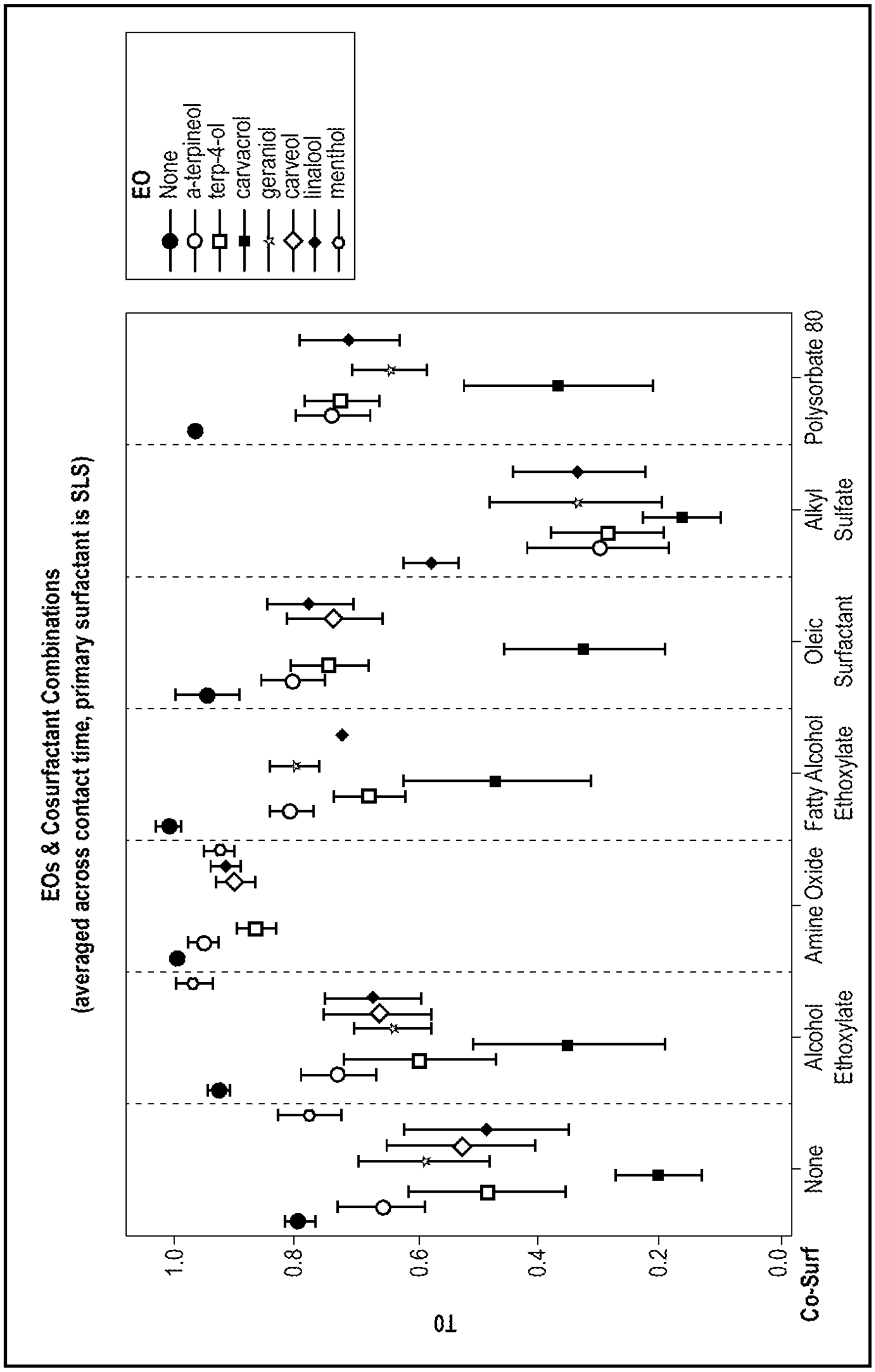
FIG. 3 shows similar normalized T0 data as in FIG. 2, but for candidate essential oil compounds paired with various candidate co-surfactants.

FIG. 3 shows similar T0 values for various essential oil compound compositions, with various combinations of surfactants. All tested samples included 1.5% SLS as the primary surfactant, with 1% of the shown essential oil compound, and 1% of the tested co-surfactant. The results show excellent results for carvacrol (with the lowest T0 values), across a variety of co-surfactants. As in FIG. 2, the results in FIG. 3 show that the inclusion of a $2^{nd}$ alkyl sulfate enhances the inhibitory effect.

Figure 4:
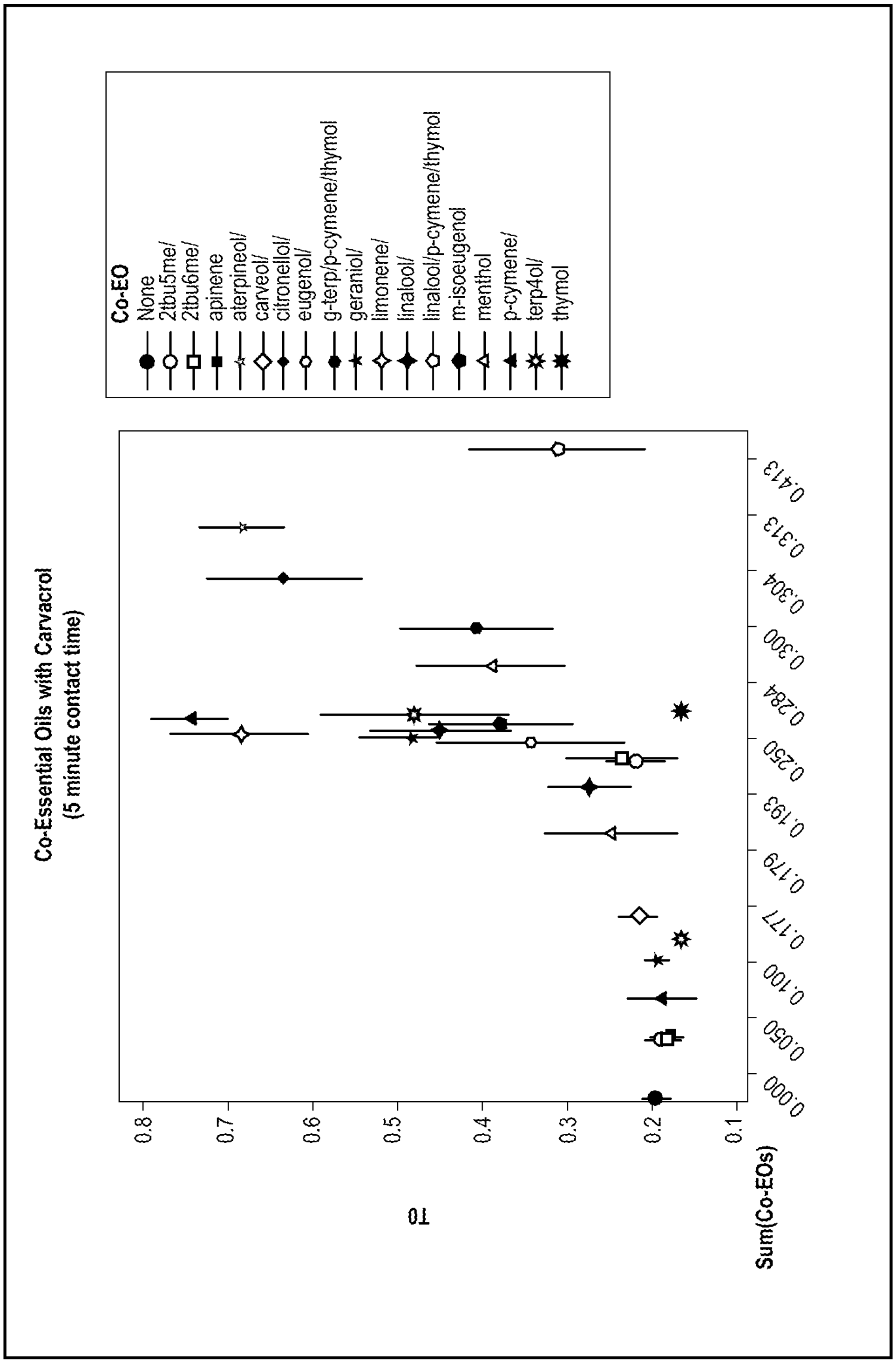
FIG. 4 shows the effect on normalized T0 of addition of a secondary essential oil compound, with carvacrol.

FIG. 4 shows how some particular secondary essential oil compounds can be included, with the carvacrol, while still maintaining good antimicrobial efficacy. That said, as shown, there are many essential oil compounds that do in fact interfere with the ability to achieve the desired inhibitory effect, and for this reason, in at least some embodiments, such additional essential oil compounds may be avoided.

Figure 5:
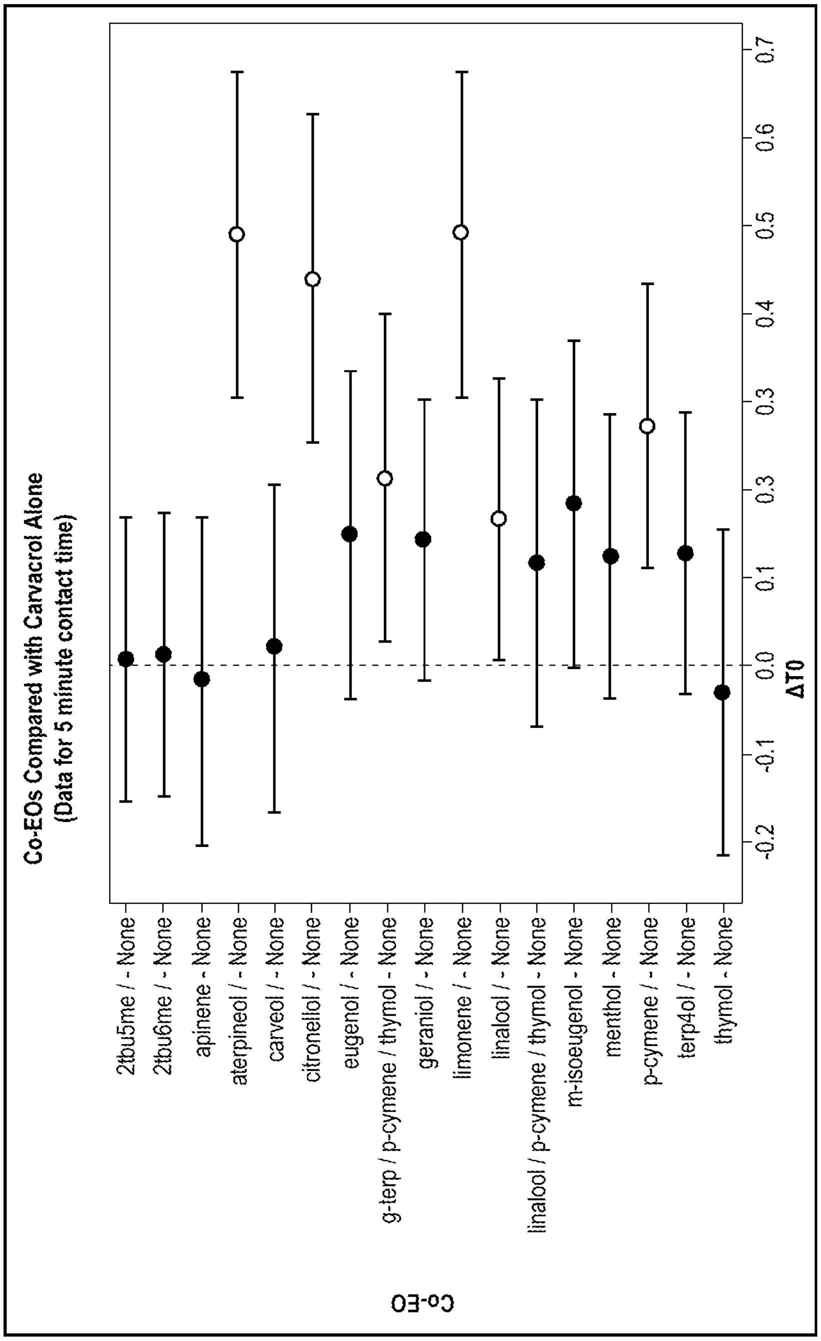
FIG. 5 shows additional data on the effect of addition of a secondary essential oil compound with carvacrol.

Illustrating similar results, FIG. 5 shows the effect of the inclusion of a secondary essential oil compound, on T0, showing how inclusion of many secondary essential oil compounds actually weakens the good performance seen by carvacrol alone. In particular, FIG. 5 plots change in T0 ($\Delta$T0) compared to carvacrol as used alone (i.e. with no secondary essential oil compound).

Figure 6:
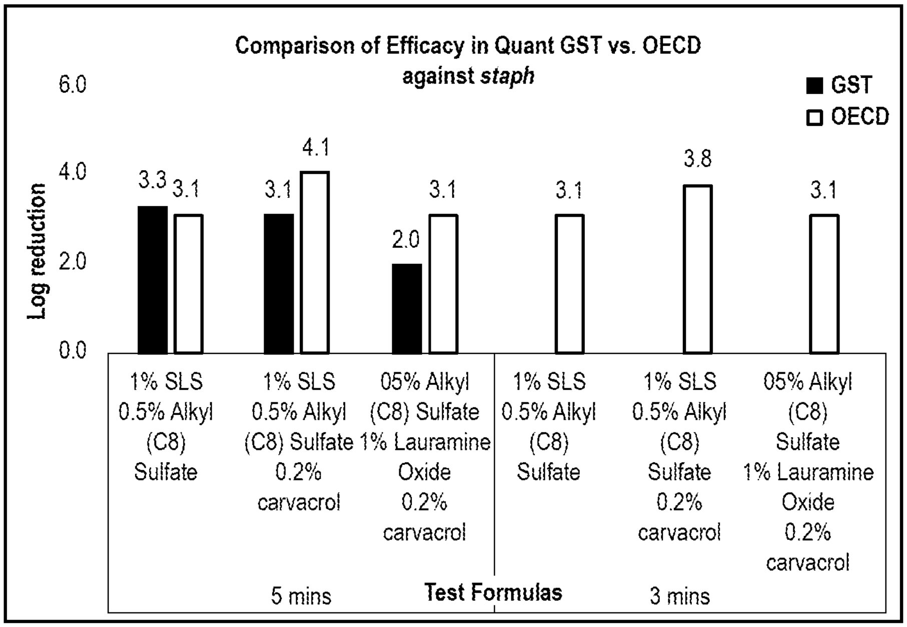
FIG. 6 shows log reduction against *Staphylococcus aureus* for various tested compositions including carvacrol and various surfactants.

FIG. 6 shows log reduction for various tested carvacrol cleaning compositions, against *Staphylococcus aureus*, with 5 minute and 3 minute contact times, for compositions including 0.2% carvacrol, with one or more surfactants. Tests were performed under standards promulgated by the EPA (e.g., the EPA's germicidal spray test "GST") and the OECD (e.g., the Organization for Economic Co-Operation and Development). The OECD standards include an evaluation of the tested compositions ability to work in an environment where the target surface being cleaned includes soiling. The GST test is carried out according to the EPA's Standard Operating Procedure for Germicidal Spray Products as Disinfectants (GSPT): Testing of *Staphylococcus aureus, Pseudomonas aeruginosa*, and *Salmonella enterica*, published under SOP MB-06-09, which is herein incorporated by reference in its entirety. Such is available at https://www.epa.gov/sites/default/files/2018-01/documents/mb-06-09.pdf. The OECD test is carried out according to the EPA's Standard Operating Procedure for OECD Quantitative Method for Evaluating Bactericidal and Mycobactericidal Activity of Microbicides Used on Hard, Non-Porous Surfaces, published under SOP MB-25-05, which is herein incorporated by reference in its entirety. Such is available at https://www.epa.gov/sites/default/files/2019-05/documents/mb-25-05.pdf.

Figure 7:
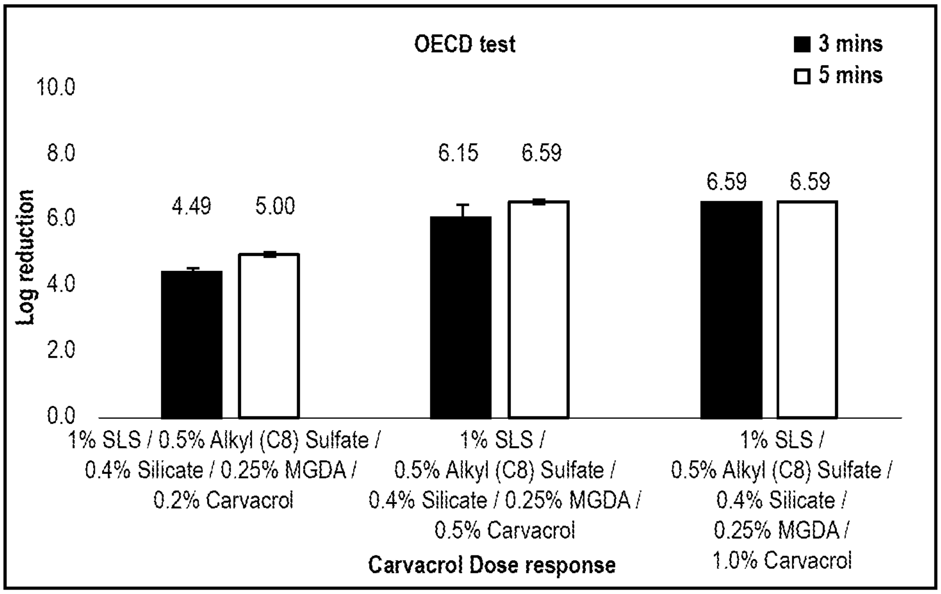
FIG. 7 shows log reduction against *Staphylococcus aureus* for various tested compositions including carvacrol in different concentrations.

FIG. 7 shows log reduction for similar tested carvacrol compositions, also against *Staphylococcus aureus*, with 3 and 5 minute contact times, for compositions including 1% SLS, 0.5% of a second alkyl sulfate surfactant, 0.4% of a silicate buffer, 0.25% of a chelating agent, and an amount of carvacrol that ranges from 0.2% up to 1%. The results show increased log reduction with increasing carvacrol concentration.

Figure 8:
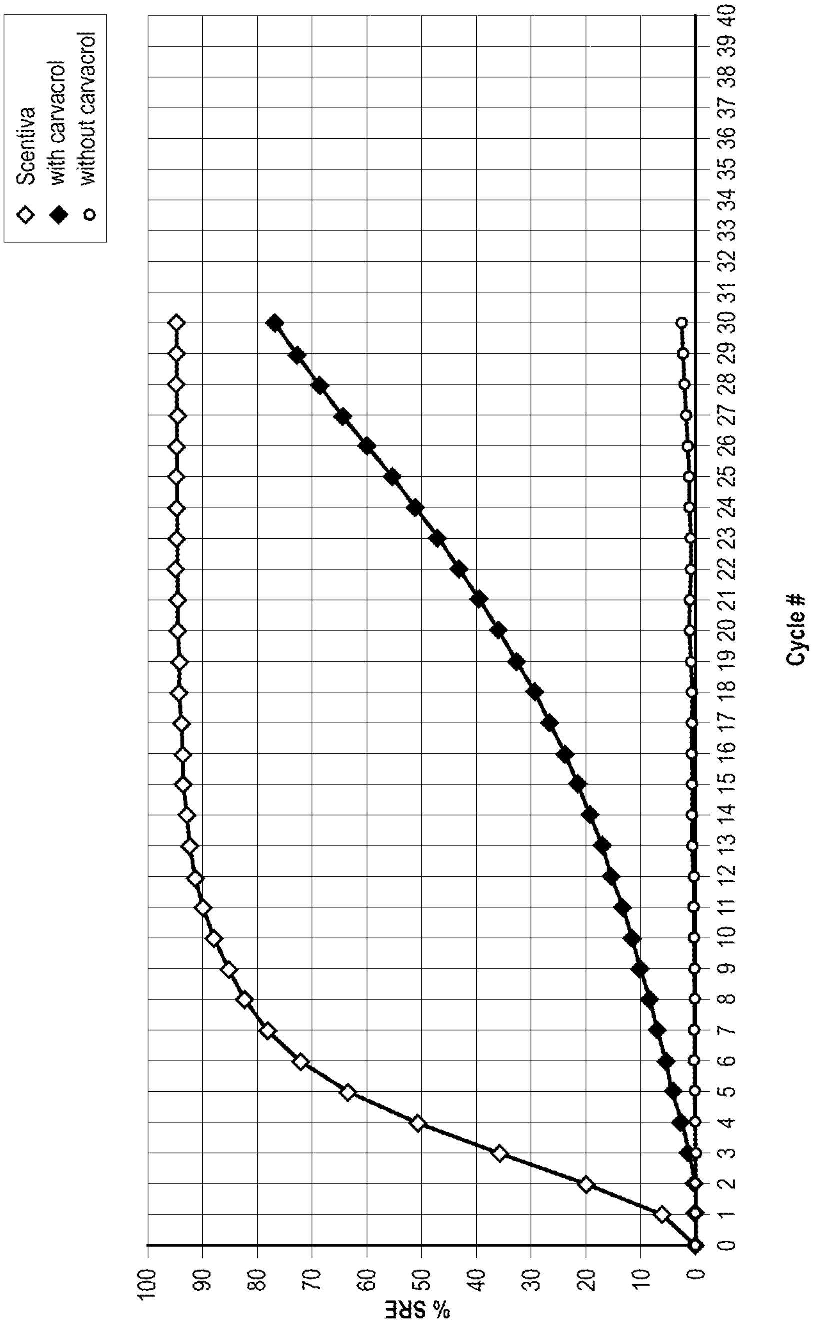
FIG. 8 shows soil removal efficiency (SRE) cleaning performance of comparative compositions with and without carvacrol at a pH of 10.

In addition to the ability to provide antimicrobial efficacy, it is beneficial that the cleaning composition also be capable of removing soil. FIG. 8 shows soil removal efficiency (SRE) results for the ability of tested compositions to remove such greasy soils. The compositions as tested in FIG. 8 each included 1.5% by weight of alkyl sulfate surfactant, 1% of alkylpolyglycoside surfactant, and 0.4% potassium carbonate buffer. One of the compositions further included 0.2% carvacrol. Both compositions had a pH of 10. In both compositions, the balance was made up of water. FIG. 8 also shows SRE results for a leading commercially available cleaning composition (Clorox® Sentiva® Disinfecting Multi-Surface Cleaner) that provides excellent soil removal, and relies on a quaternary ammonium compound for antimicrobial benefits. Clorox® Sentiva® Disinfecting Multi-Surface Cleaner is a bleach-free, all-purpose cleaner that includes water, lauramine oxide, ethanolamine, alkyl $C_{12}$-$C_{16}$ dimethylbenzyl ammonium chloride, myristamine oxide, tetrapotassium EDTA, ethanol, and fragrance. As shown in FIG. 8, the inclusion of the carvacrol greatly enhances the soil removal efficacy of the tested composition, as compared to the composition that included no carvacrol.

Figure 9:
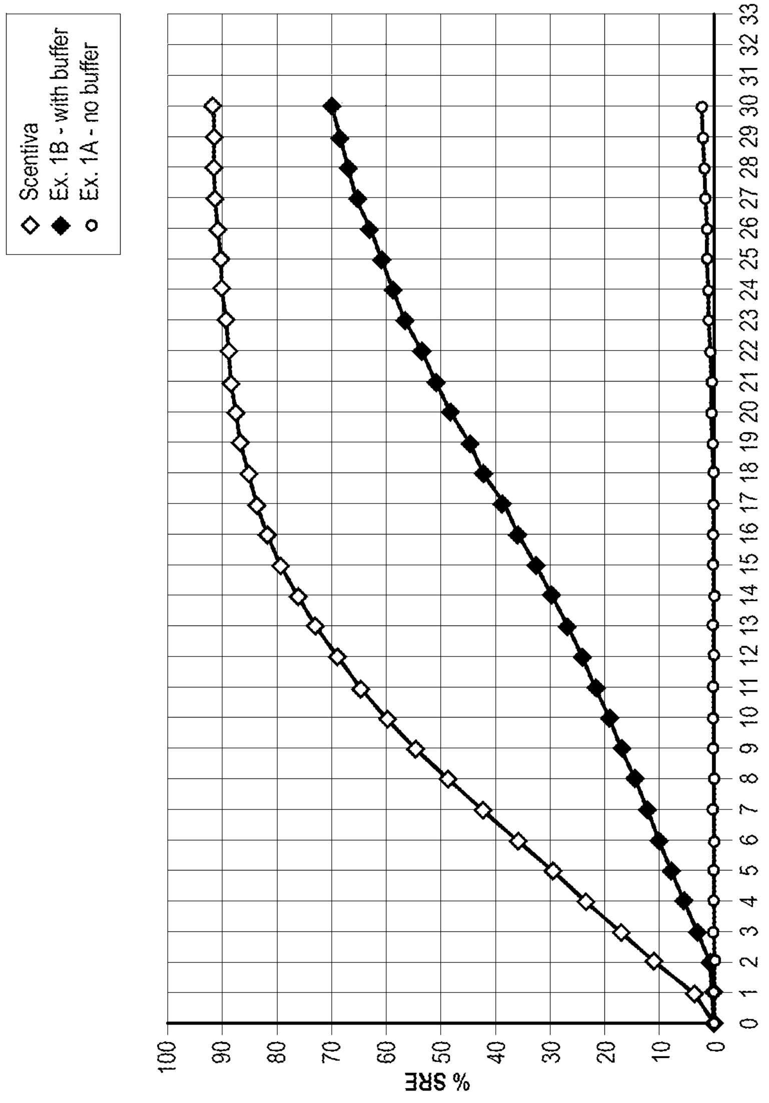
FIG. 9 shows soil removal efficiency (SRE) cleaning performance of comparative compositions with and without addition of a buffer, at a pH of 11.

FIG. 9 shows the effect of inclusion of a buffer on soil removal efficiency. Both Ex. 1A and 1B of FIG. 9 included 1% SLS and 1% ethylene glycol monobutyl ether (i.e., glycol ether solvent). Ex. 1B included 0.4% potassium carbonate buffer, while Ex. 1A included no buffer. The balance of the compositions was made up of water. Both compositions had a pH of 11. As noted herein, it is unusual and surprising that the present compositions having such a high pH, particularly without inclusion of a hypohalite bleach antimicrobial agent, can exhibit good antimicrobial efficacy (e.g., as evidenced by FIGS. 6-7).

Figure 10:
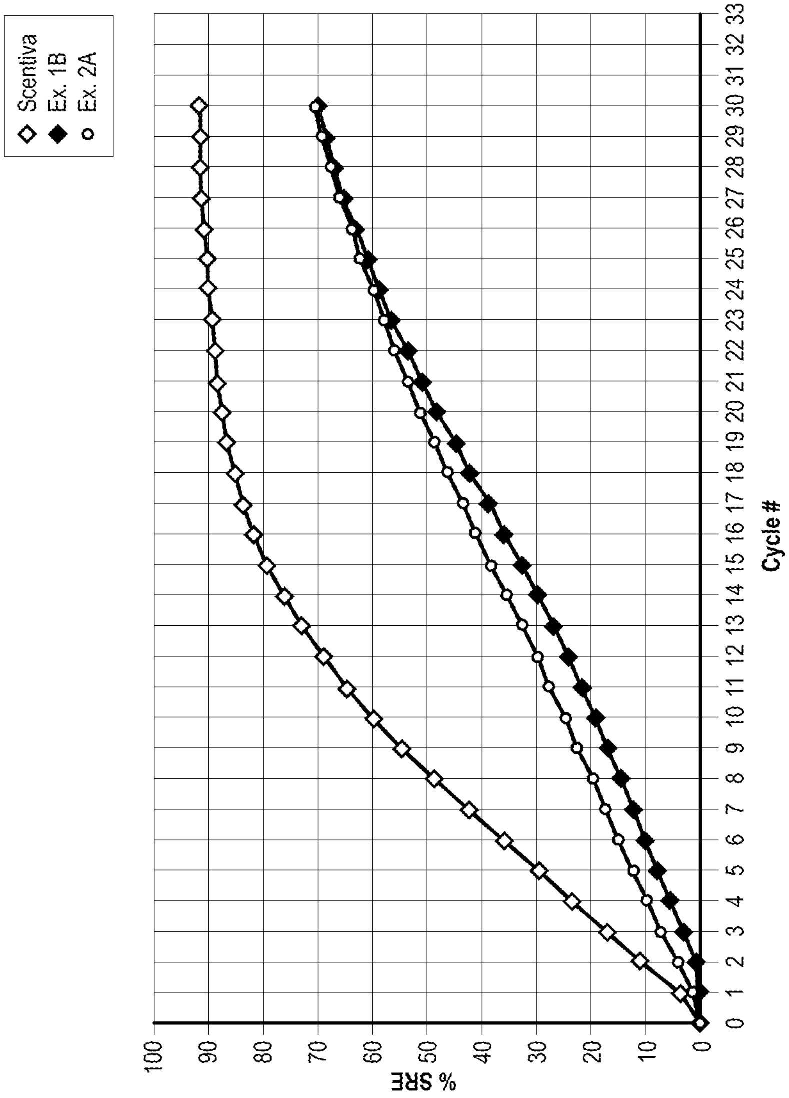
FIG. 10 shows soil removal efficiency (SRE) cleaning performance of comparative buffered compositions with (Ex. 1B) and without (Ex. 2A) addition of a glycol ether solvent.

FIG. 10 shows that the composition exhibits similar soil removal efficiency, whether a solvent is included or not. Ex. 1B was described previously. Ex. 2A, also tested in FIG. 10, was similarly formulated (e.g., 1% SLS, 0.4% potassium carbonate), but without the glycol ether solvent. Both compositions had a pH of 11. As shown in FIG. 10, the inclusion of the glycol ether solvent does not contribute significantly to any improved soil removal efficiency. As such, in an embodiment, no solvents (other than water) need be included within the composition. Where a fragrance or similar active is included, the carvacrol component is actually typically able to solubilize such fragrance, without the need for any additional solvent in the system.

Figure 11:
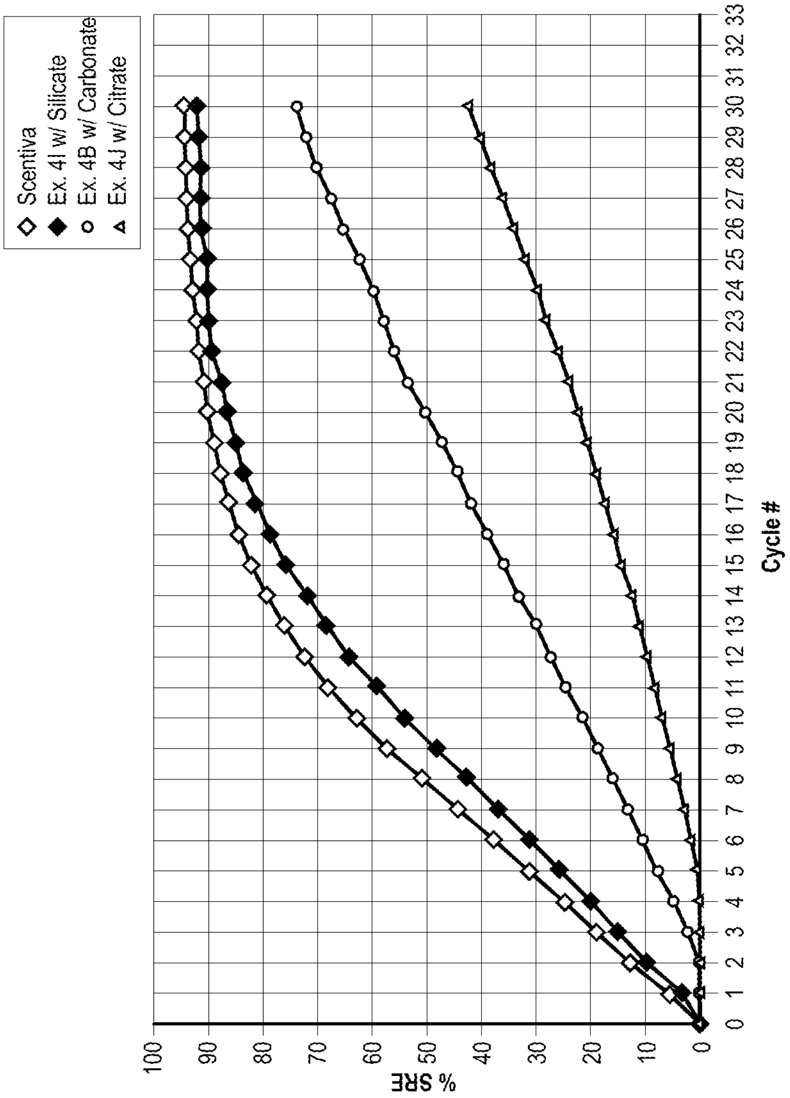
FIG. 11 shows soil removal efficiency (SRE) cleaning performance of comparative compositions with different buffers (carbonate, silicate, or citrate).

FIG. 11 shows the effect of selection of the buffer, on soil removal efficiency. Each of Ex. 4B, 4I, and 4J of FIG. 11 included 1% SLS and 1.5% lauramine oxide surfactant. Ex. 4B included 0.4% potassium carbonate buffer, while Ex. 4I included 0.4% sodium silicate buffer, and Ex. 4J included 0.4% potassium citrate buffer. The balance of the compositions was made up of water. Each composition had a pH of 11. As shown in FIG. 11, use of a silicate buffer was particularly advantageous, providing soil removal efficiency characteristics similar to that of the leading commercial product used as a control. As noted, the presently contemplated compositions also provide antimicrobial efficacy without use of quats, which the leading commercial comparative product does not.

Figure 12:
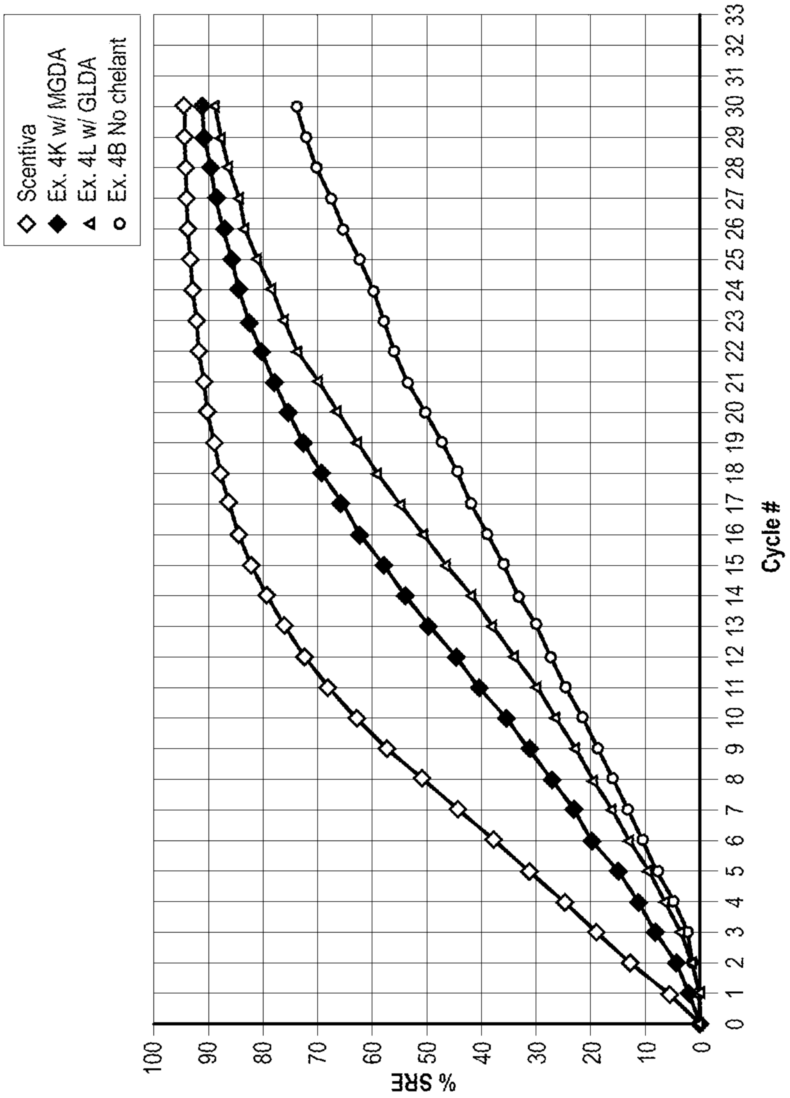
FIG. 12 shows soil removal efficiency (SRE) cleaning performance of comparative compositions with various chelating agents (aminocarboxylates, such as a salt of methylglycinediacetic acid (MGDA), or a tetra sodium salt of glutamic acid diacetic acid (GLDA).

FIG. 12 shows the effect of various chelating agents on soil removal efficiency. Each of Ex. 4B, 4K, and 4L of FIG. 12 included 1% SLS, 1.5% lauramine oxide surfactant, and 0.4% potassium carbonate. Ex. 4B was described previously, and included no chelating agent, while Ex. 4K and 4L were similar but included 0.25% MGDA and GLDA chelating agents, respective. In each case, the balance of the compositions was made up of water. Each composition had a pH of 11. As shown in FIG. 12, inclusion of a chelating agent improves soil removal efficiency. The inclusion of chelating agents may also enhance antimicrobial efficacy, as the chelating agent is able to remove or sequester divalent cations (e.g., $Ca^{2+}$, $Mg^{2+}$, etc.), facilitating penetration of a bacterial cell wall by the carvacrol, particularly in gram negative bacteria. Chelation of divalent metal cations may also help to prevent/reduce carvacrol oxidation, thereby improving the formulation's stability and efficacy.

Figure 13:
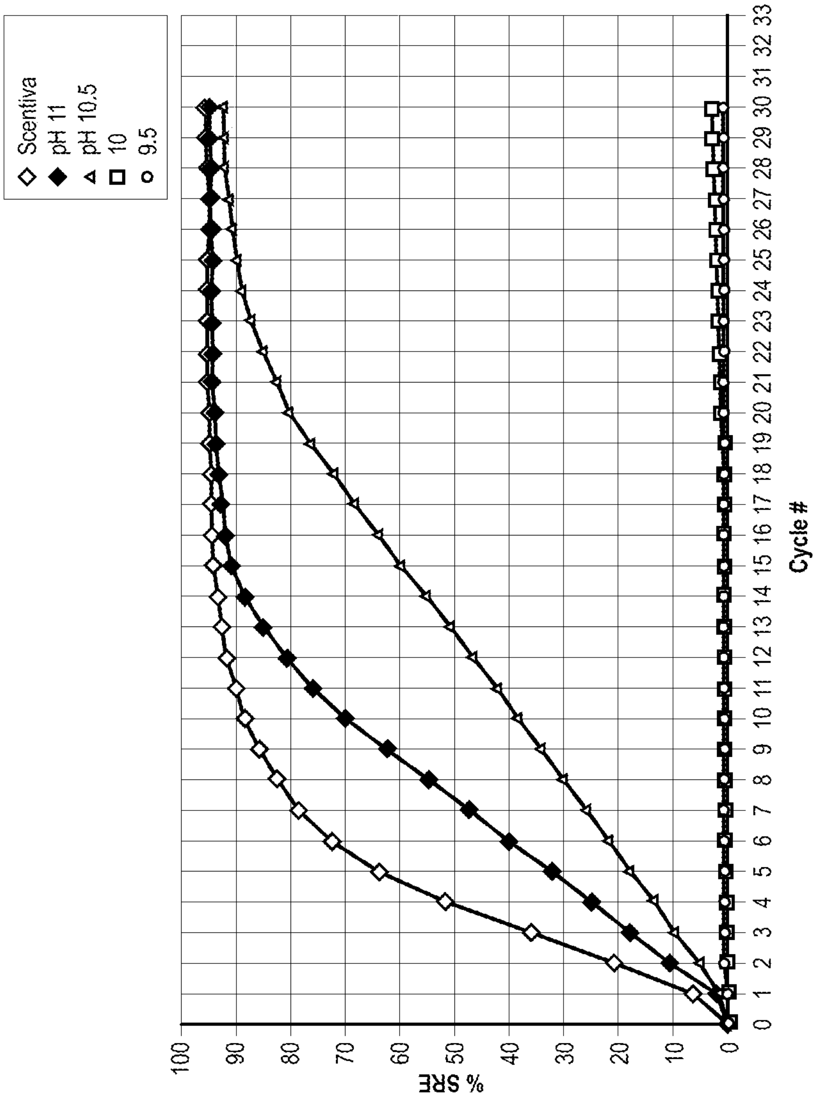
FIG. 13 shows soil removal efficiency (SRE) cleaning performance of comparative compositions at different pH values.

FIG. 13 shows the effect of pH on soil removal efficiency. Each of the exemplary formulations in FIG. 13 included 1.5% alkyl sulfate, 1% alkylpolyglycoside surfactant, and 0.4% potassium carbonate. In each case, the balance of the compositions was made up of water. The compositions were therefore otherwise identical, except for adjustment of the pH to a pH of 9.5, 10, 10.5 or 11, as shown. As shown in FIG. 13, higher pH significantly improves soil removal efficiency. As noted, it is unusual, and perhaps unique, to achieve both good soil removal and antimicrobial efficacy at such high pH values, without reliance on antimicrobial agents other than carvacrol (e.g., hypohalites).

Figure 14:
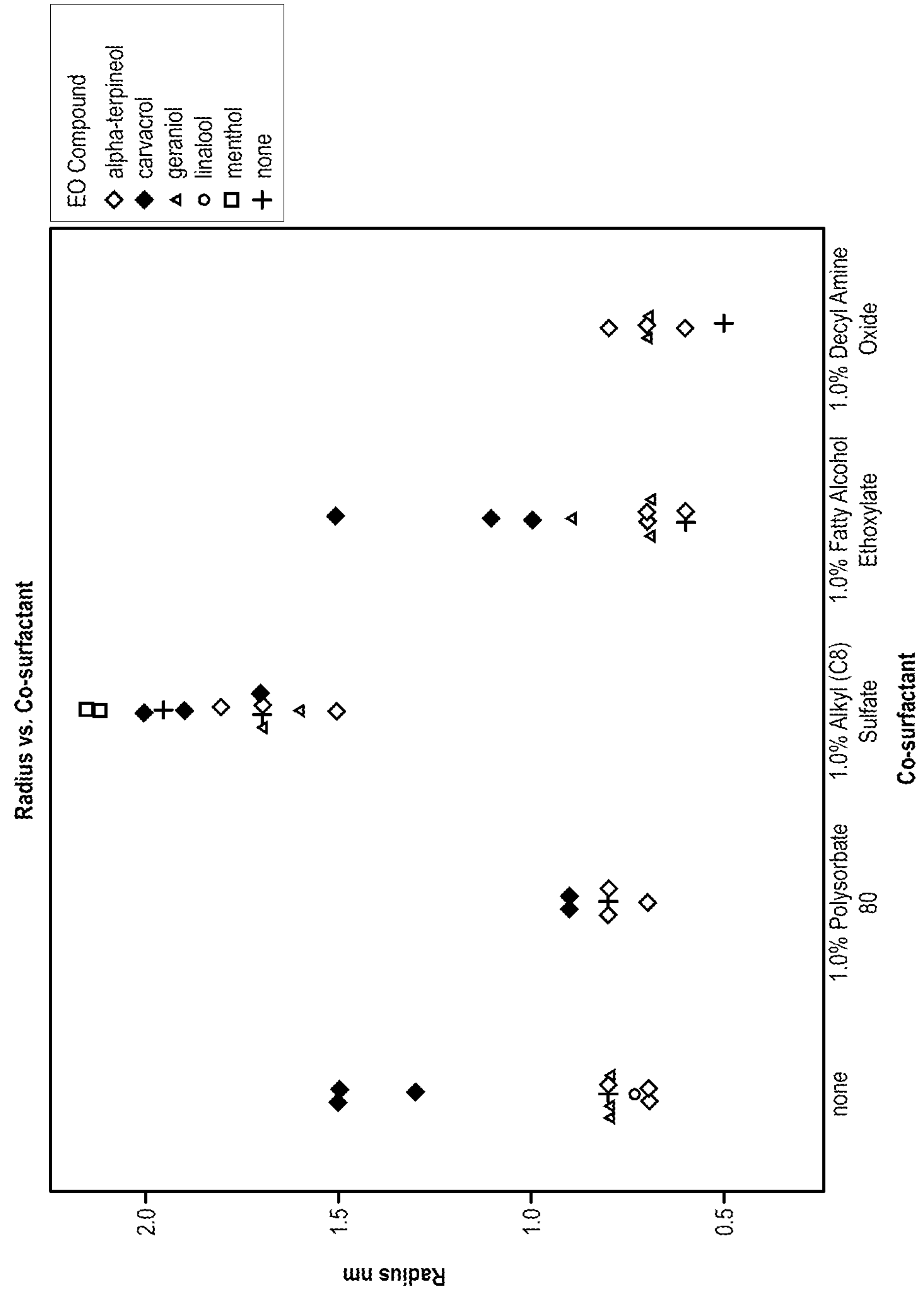
FIG. 14 shows the effect on micelle size radius for various combinations of essential oil compounds and co-surfactants.

FIG. 14 shows regularization radius values (i.e., micelle size) for various co-surfactants, for several essential oil compounds. Each composition included SLS 1.5% as the primary surfactant. As shown, the use of an additional alkyl sulfate surfactant (e.g., $C_8$ alkyl sulfate in addition to SLS) increases the micelle size. FIG. 14 also shows an effect of increased micelle size when carvacrol is added to a composition that otherwise included only SLS. The increased micelle size correlates with improved T0 (improved inhibitory effect). Related evaluation of critical micelle concentration (CMC) shows a synergism between CMC and the use mixtures of different alkyl sulfates (e.g., SLS and a C8 alkyl sulfate). For example, with only 1 alkyl sulfate, the CMC is about 16,000 mg/L, while CMC drops to well below 1000 mg/L, or even below 500 mg/L when a mixture of alkyl sulfates is used (e.g., where [SLS]/([SLS]+[$C_8$ alkyl sulfate]) ranges from 0.05 to 0.95, or from 0.1 to 0.9, or from 0.2 to 0.8).

Some preliminary results for a carvacrol composition tested against MS2 were obtained. The tested composition included 1.5% SLS, 0.5% $C_8$ alkyl sulfate, 0.4% sodium silicate buffer, 0.25% of the tri sodium salt of alanine, N, N-bis(carboxymethyl) as a chelating agent, 0.5% carvacrol, and 0.4% fragrance. With a contact time of 10 minutes, the composition reduced the target MS2 population by more than 60% with respect to a blank treatment control. It will be apparent that the present compositions including carvacrol may be suitable for use against a variety of target microbes, e.g., including various bacteria, viruses (e.g., enveloped and non-enveloped viruses and/or bacteriophages, also known simply as phages), and fungi. Various non-limiting examples of such include MS2, phi6, SARS-CoV-2, murine norovirus, *Candida albicans*, as well as numerous others.

The following articles are herein incorporated by reference in their entirety: *Antifungal activity and mode of action of carvacrol against Candida albicans strains*, Lima et al., The Journal of Essential Oil Research, 2013, Vol. 25, No. 2 p. 138-142*; Antifungal Activity of Essential Oils, Cinnamaldehyde and Carvacrol against Malassezia furfur and Candida albicans*, Ferhout et al., Journal of Essential Oil Research, 2011, Vol. 11, No. 1 p. 119-129; and *Antiviral efficacy and mechanisms of action of oregano essential oil and its primary component carvacrol against murine norovirus*, Gilling et al., Journal of Applied Microbiology, 2014, Vol. 116, p. 1149-1163.

Without departing from the spirit and scope of this invention, one of ordinary skill can make various modifications to the invention to adapt it to various usages and conditions. As such, these changes and modifications are properly, equitably, and intended to be, within the full range of equivalence of the following claims.

The invention claimed is:

1. A cleaning composition comprising:

(a) 0.1% to 2.0% by weight of carvacrol as an antimicrobial agent;

(b) 0.5% to 5.0% by weight of one or more anionic surfactants;

(c) 0.1% to 1.0% by weight of a buffer;

(d) 85% to 99% water;

(e) optionally, one or more adjuncts selected from the group consisting of: pH adjusters, solvents, sequestrants or chelating agents, fragrances or perfumes, dyes and/or colorants, builders, defoamers, thickeners, hydrotropes, antimicrobial compounds, preservatives, solubilizing materials, stabilizers, lotions and/or mineral oils, enzymes, cloud point modifiers, and any combinations or mixtures thereof;

wherein the cleaning composition has a pH of 9-12 and the cleaning composition exhibits at least a 3-log reduction in a *Staphylococcus aureus* population within 10 minutes on a target surface; and wherein the cleaning composition is substantially free from amine oxide surfactants, alcohol ethoxylate surfactants, and alkylpolyglycoside surfactants.

2. The cleaning composition of claim 1, wherein the anionic surfactant comprises at least one $C_8$-$C_{12}$ alkyl sulfate.

3. The cleaning composition of claim 1, wherein the buffer comprises at least one of a carbonate, a silicate, or a citrate.

4. The cleaning composition of claim 1, wherein the composition has a pH of about 10.5-12.

5. The cleaning composition of claim 1, wherein the composition is loaded onto a substrate.

6. A cleaning composition comprising:

(a) 0.1% to 2.0% by weight of carvacrol as an antimicrobial agent;

(b) 0.1% to 3.0% by weight of a first anionic surfactant;

(c) 0.1% to 3.0% by weight of a second anionic surfactant;

(d) 85% to 99% water;

(e) optionally, one or more adjuncts selected from the group consisting of: pH adjusters or buffers, solvents, sequestrants or chelating agents, fragrances or perfumes, dyes and/or colorants, builders, defoamers, thickeners, hydrotropes, antimicrobial compounds, preservatives, solubilizing materials, stabilizers, lotions and/or mineral oils, enzymes, or cloud point modifiers, and any combinations or mixtures thereof;

wherein the second anionic surfactant comprises a $C_8$-$C_{12}$ alkyl sulfate, having a different chain length than the first anionic surfactant;

wherein the cleaning composition is substantially free from amine oxide surfactants, alcohol ethoxylate surfactants, and alkylpolyglycoside surfactants;

wherein the cleaning composition has a pH of 9-12 and the cleaning composition exhibits at least a 3-log reduction in a *Staphylococcus aureus* population within 10 minutes on a target surface.

7. The cleaning composition of claim 6, wherein the first anionic surfactant comprises an alkyl sulfate.

8. The cleaning composition of claim 6, wherein the composition further comprises a buffer, the buffer comprising at least one of a carbonate, a silicate or a citrate.

9. The cleaning composition of claim 6, wherein the composition further comprises a chelating agent, the chelating agent comprising a salt of at least one of an aminocarboxylate, methylglycinediacetic acid (MGDA), glutamic acid diacetic acid (GLDA), ethylenediamine tetraacetic acid (EDTA), citrate or glucaric acid.

10. The cleaning composition of claim 6, wherein the cleaning composition exhibits at least a 3-log reduction in a *Pseudomonas aeruginosa* population within 10 minutes on a target surface.

11. The cleaning composition of claim 6, wherein the cleaning composition exhibits at least a 3-log reduction in a *Listeria monocytogenes* population within 10 minutes on a target surface.

12. The cleaning composition of claim 6, wherein the cleaning composition exhibits at least a 3-log reduction in an *E. coli* population within 10 minutes on a target surface.

13. The cleaning composition of claim 6, wherein the cleaning composition exhibits at least a 3-log reduction in a *Salmonella enteritidis* population within 10 minutes on a target surface.

14. A cleaning composition consisting of:

(a) 0.1% to 2.0% by weight of an antimicrobial having the following structure:

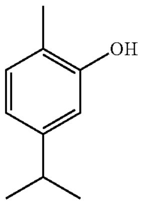

(b) 0.1% to 3.0% by weight of a first anionic surfactant;

(c) 0.1% to 3.0% by weight of a second anionic surfactant;

(d) 85% to 99% water;

(e) optionally, one or more adjuncts selected from the group consisting of: pH adjusters or buffers, solvents, sequestrants and/or chelating agents, fragrances and/or perfumes, dyes and/or colorants, builders, defoamers, thickeners, hydrotropes, antimicrobial compounds, preservatives, solubilizing materials, stabilizers, lotions and/or mineral oils, enzymes, or cloud point modifiers;

wherein the cleaning composition is substantially free from amine oxide surfactants, alcohol ethoxylate surfactants, and alkylpolyglycoside surfactants;

wherein the antimicrobial is a liquid at 20-25° C.

15. The cleaning composition of claim 14, wherein both the first and second anionic surfactants comprise $C_8$-$C_{12}$ alkyl sulfates, having different chain lengths.

16. The cleaning composition of claim 14, wherein the composition is void of amine oxide, alcohol ethoxylate, and alkylpolyglycoside surfactants.

17. The cleaning composition of claim 14, further comprising a buffer, wherein the buffer comprises at least one of a carbonate, a silicate, or a citrate.

18. The cleaning composition of claim 14, wherein the composition further comprises a chelating agent, the chelating agent comprising a salt of at least one of an aminocarboxylate, methylglycinediacetic acid (MGDA), glutamic acid diacetic acid (GLDA), ethylenediamine tetraacetic acid (EDTA), citrate, or glucaric acid.

19. The cleaning composition of claim 14, wherein the composition is free of thymol.

20. The cleaning composition of claim 1, wherein the carvacrol is the only included antimicrobial agent.

* * * * *